(12) United States Patent
Paulson et al.

(10) Patent No.: US 12,281,867 B2
(45) Date of Patent: Apr. 22, 2025

(54) CLUTCH ASSEMBLY FOR A ROTARY MACHINE GUN

(71) Applicant: DTV Arms, LLC, Hendersonville, TN (US)

(72) Inventors: Kristopher Lee Paulson, Hendersonville, TN (US); Matthew Steinhauser, Philadelphia, PA (US)

(73) Assignee: CHD Holdings, LLC, Nashville, TN (US)

( * ) Notice: Subject to any disclaimer, the term of this patent is extended or adjusted under 35 U.S.C. 154(b) by 0 days.

(21) Appl. No.: 18/400,096

(22) Filed: Dec. 29, 2023

(65) Prior Publication Data

US 2025/0085070 A1 Mar. 13, 2025

Related U.S. Application Data

(60) Provisional application No. 63/538,074, filed on Sep. 13, 2023.

(51) Int. Cl.
| | |
|---|---|
| *F41A 9/36* | (2006.01) |
| *F16D 11/10* | (2006.01) |
| *F16D 23/14* | (2006.01) |
| *F16D 27/00* | (2006.01) |

(52) U.S. Cl.
CPC ............. *F41A 9/36* (2013.01); *F16D 11/10* (2013.01); *F16D 23/14* (2013.01); *F16D 27/00* (2013.01)

(58) Field of Classification Search
CPC .......... F16D 11/10; F16D 11/14; F16D 11/04; F16D 2011/008
See application file for complete search history.

(56) References Cited

U.S. PATENT DOCUMENTS

| | | | |
|---|---|---|---|
| 4,266,646 A * | 5/1981 | Telford | F16D 11/14 |
| | | | 192/69.43 |
| 2017/0254400 A1 * | 9/2017 | Onitake | F16D 27/09 |
| 2022/0111715 A1 * | 4/2022 | Holzapfel | B60K 17/356 |
| 2022/0235829 A1 * | 7/2022 | Hand | F16D 11/14 |

* cited by examiner

*Primary Examiner* — Timothy Hannon
(74) *Attorney, Agent, or Firm* — Eric B. Fugett; Mark A. Pitchford; Pitchford Fugett, PLLC

(57) ABSTRACT

A clutch assembly for a rotary machine gun includes a drive sleeve mountable to the gun, a clutch gear slidably and rotatably mounted on the sleeve, a clutch housing on the sleeve, a shifter in the housing, and a solenoid assembly secured to the housing. The clutch gear is configured to engage and rotate with the sleeve. A plunger on the sleeve urges the clutch gear away from engagement with the sleeve. The shifter is configured to push the clutch gear into engagement with the sleeve when actuated. The solenoid assembly includes a solenoid housing, a plunger configured to actuate the shifter, a plunger rod, a biasing member, and a lever on the plunger rod. The lever is manually pivotable to move the clutch gear to a neutral position wherein the gear is rotatable about the sleeve in either of two opposing directions until the solenoid assembly is electrically actuated.

6 Claims, 29 Drawing Sheets

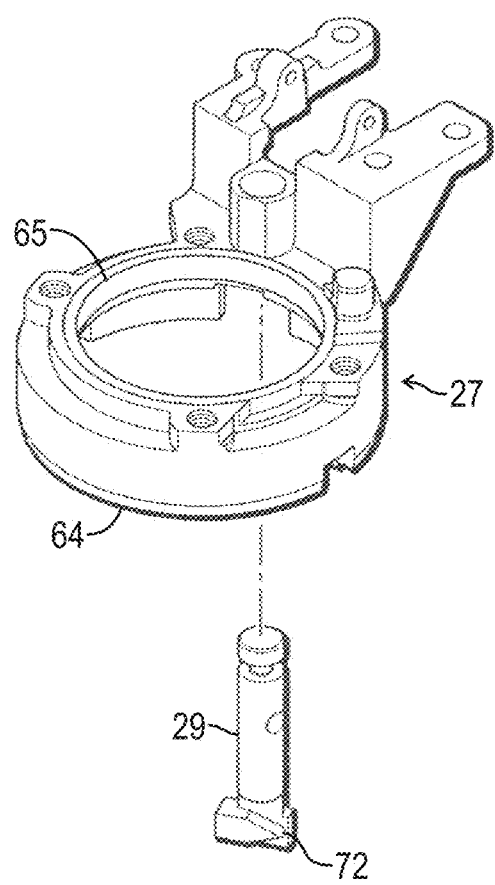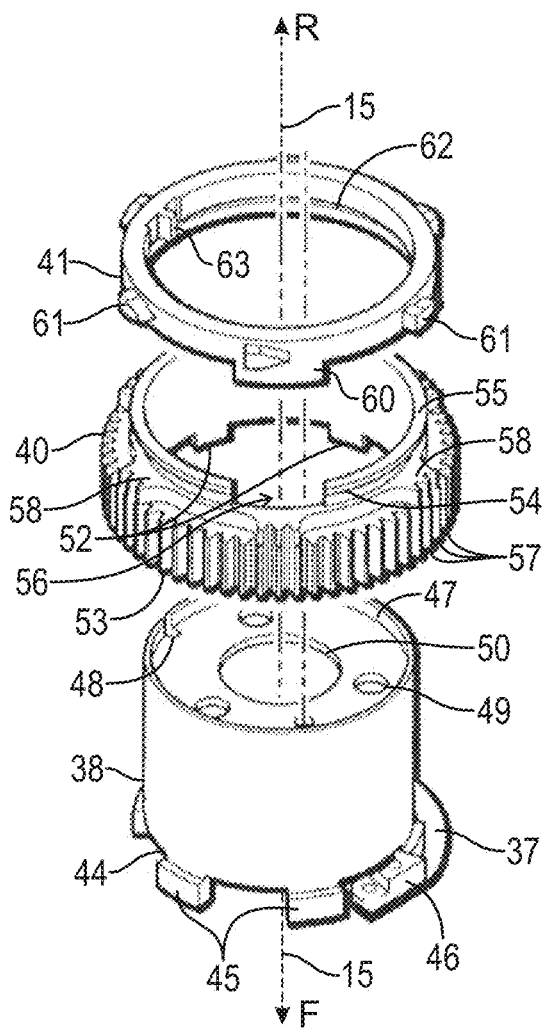
FIG. 8
(PRIOR ART)
FIG. 9
(PRIOR ART)

CLUTCH ASSEMBLY FOR A ROTARY MACHINE GUN

BACKGROUND OF THE INVENTION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This non-provisional patent application claims priority to U.S. Provisional Patent Application Ser. No. 63/538,074, filed Sep. 13, 2023 and titled "CLUTCH ASSEMBLY FOR A ROTARY MACHINE GUN," the entire disclosure of which is hereby incorporated by reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to rotary machine guns, and more particularly, to clutch assemblies for rotary machine guns.

A rotary machine gun is an externally powered weapon system consisting of multiple barrels arranged to rotate about the central longitudinal axis of a rotor while discharging ammunition at a high rate of fire. An example is the M134 "minigun," a six-barrel electrically driven rotary machine gun powered by an external power supply (e.g., a battery pack or vehicle power system). A conventional M134 minigun 10 is depicted in prior art FIGS. 1-9. The conventional M134 minigun includes a rotor housing 11, a rotor 12, bolts (not visible), barrels 13, a main drive assembly 14, a feeder delinker 15, a clutch assembly 16, a spade grip 17, a gun control unit (GCU) 18, and an external power supply 19.

The rotor housing 11 contains the rotor 12. The rotor 12 defines a central longitudinal axis 20 of the machine gun 10. The axis 20 defines a forward direction F and a rearward direction R. The barrels 13 are attached to a forward end of the rotor 12 and rotate with the rotor 12 about the central axis 20. The rotor 12 is driven (i.e., rotated) by the main drive assembly 14. The main drive assembly 14 is mounted on the rotor housing 12. The main drive assembly 14 includes a drive gear driven by a motor gearhead (not visible) connected to a main drive motor. The drive gear is meshed with a geared bearing 21 on the forward end of the rotor 12. Rotation of the drive gear by the main drive motor rotates the geared bearing 21 and thus the rotor 12 and barrels 13.

The rotor 12 has six bolt tracks and six bolts disposed within the bolt tracks (not visible). The bolts and bolt tracks are arranged radially around the central axis 20 of the rotor. Each bolt and bolt track extends longitudinally along the rotor parallel to the central axis 20. The bolt tracks guide the movement of the bolts forward and rearward along the rotor 12. The rotor housing has an elliptical cam track 22 that is angled diagonally between the front 22 and rear 26 of the rotor housing 11. A cam follower in the form of a roller on each bolt is disposed within the cam track. Rotation of the rotor 12 rotates the cam followers around the elliptical cam track 22. The diagonal orientation of the cam path translates the rotational movement of the cam followers into longitudinal movement of the bolts. As the cam followers move longitudinally, the cam followers move the bolts forward and rearward within the bolt tracks. During firing, the bolts receive a round of ammunition as they move forward, fire the round of ammunition at their most forward point, and eject the spent casing as they move rearward. Firing thus occurs at a fixed-point during rotation of the rotor 12, resulting in a round being fired from each barrel once per complete revolution.

Linked ammunition is typically stored in an ammunition canister 23. A booster motor 24 on the ammunition canister 23 advances linked ammunition from the canister 23 into the feeder delinker 15 through a flexible feed chute 9. The feeder delinker 15 delinks the linked ammunition and then feeds the delinked rounds through the rotor housing 11 to the bolts while the feeder delinker 15 is being rotated. Rotation of the feeder delinker 15 is controlled by clutch assembly 16.

The clutch assembly 16 is mounted to the rear end or "tail" 25 of the rotor 12 at the rear 26 of the rotor housing 11. The conventional clutch assembly 16 includes clutch housing 27, brass bushing 28, clutch shift 29, spring-loaded anti-rotating slide 30 mounted on the exterior of the clutch housing 27, actuation arm 32, bolts 33, clutch gear assembly 34, and solenoid 36. The clutch gear assembly 34 is actuatable by the solenoid 36. The conventional clutch gear assembly 34 includes positioner spring 37, drive sleeve 38, clutch gear 40, rotating knife 41, aft rotor support 42, and screw 43.

The conventional drive sleeve 38 has an open forward end 44 in which the rotor tail 25 is received. The forward end 44 of the drive sleeve has a plurality of crowns 45 and a drive block 46. The positioner spring 37 and drive block 46 are riveted to the drive sleeve 38. The positioner spring 37 extends around a portion of the open forward end 44 of the drive sleeve from the drive block 46. The rear end 47 of the drive sleeve 38 has a slot 48, three bolt holes 49, and a central aperture 50, and a screw hole 51. The drive sleeve 38 is secured to and rotates with the rotor 12 inside the assembled clutch assembly 16 when the clutch assembly 16 is properly secured to the minigun 10.

The conventional clutch gear 40 has a plurality of drive teeth 52 at the forward end 53, an exterior circumferential groove 54 at the rear end 55, a gap 56 in the rear end 55, a plurality of coupling teeth 57, and a plurality of lugs 58 extending rearwardly from the coupling teeth 57. The drive teeth 52 of the clutch gear 40 are configured to engage the sides of the crowns 45 on the drive sleeve 38 when the clutch assembly 16 is actuated so that the clutch gear 40 rotates with the drive sleeve 38 and the rotor 12 about the central axis 20 when the rotor 12 is rotating during firing. The clutch gear 40 rotates counter-clockwise (i.e., from the perspective of an operator firing the gun) with the rotor during firing. The coupling teeth 57 of the clutch gear 40 are meshed with the teeth of a complimentary drive gear 59 of the feeder-delinker 15 such that counter-clockwise rotation of the clutch gear 40 rotates the feeder delinker gear 59 and thus drives the feeder delinker 15. The coupling teeth 57 on the clutch gear 40 are wider than the teeth of the feeder delinker gear 59 so that the clutch gear 40 can slide back and forth on the drive sleeve 38 to disengage or engage the drive sleeve 38 while the coupling teeth 57 remain meshed with the teeth of the feeder delinker gear 59.

The rotating knife 41 has a tang 60, a plurality of wedge-shaped knives 61, an interior circumferential groove 62, and an alignment tab 63. The rotating knife 41 is rotatably mounted on the rear end 55 of the clutch gear 40 opposite the coupling teeth 56 from the drive teeth 52. The tang 60 of the rotating knife 41 is received through the gap 56. The tang 60 is captured by and rides in the exterior circumferential circular groove 54 of the clutch gear 40. A portion of the clutch gear 40 is captured by and rides in the interior circumferential groove 62 of the rotating knife 41.

The drive sleeve 38 is received in and passes through the clutch gear 40 and the rotating knife 41. The clutch gear 20 with attached rotating knife 41 is rotatably mounted on the drive sleeve 38. The alignment tab 63 on the rotating knife 41 is received in the slot 48 of the drive sleeve, which enables the rotating knife 41 to rotate on the clutch gear 40 with the drive sleeve 38 while the drive sleeve is rotating. The clutch gear 40 with attached rotating knife 41 is slidable along the drive sleeve 38 exclusively between an engaged position at the forward end 44 of the drive sleeve 38, and a disengaged position at the rear 47 of the drive sleeve 38. The conventional clutch gear 40 is in the engaged position when a forward surface of the clutch gear contacts the rear surfaces of the crowns 45 on the drive sleeve 38 and the drive teeth 52 contact the sides of the crowns 45 so that rotation of the drive sleeve 38 causes the clutch gear 40 to rotate counter-clockwise with the drive sleeve 40 and rotating knife 41. The conventional clutch gear 40 is in the disengaged position when a lug 58 on the clutch gear engages an arcuate projection 31 on the clutch housing 27 or the drive block 46 engages the anti-rotating slide 30 to prevent rotation of the clutch gear 40. In this position, the drive teeth 52 are not rotationally engaged or engageable by the crowns 45. The conventional clutch gear 40 with attached rotating knife 41 can only be in either the engaged position or disengaged position at any given time. As such, the conventional clutch gear 40 is only ever rotatable in one direction (i.e., counter-clockwise).

The assembled drive sleeve 38, clutch gear 40, and rotating knife 41 are received in a forward end 64 of the clutch housing 27 with the rear end of the drive sleeve 38 against the brass bushing 28. The aft rotor support 42 is received in a rear end 65 of the clutch housing 27 against the brass bushing 28 and adjacent the rear end 47 of the drive sleeve 38. The aft rotor support 42 extends through the clutch housing 27 and the central aperture 50 in the drive sleeve 38. The screw 43 extends through the drive sleeve 38 into the aft rotor support 42. The screw 43 secures the drive sleeve and aft rotor support to each other about the brass bushing 28, thereby capturing the clutch gear 40 between the crowns 45 of the drive sleeve 38 and the clutch housing 40. Three bolts 33 extend through the complimentary bolts holes 66 in the aft rotor support 42, the bolt holes 49 in the drive sleeve 38, and into the rotor tail 25 to secure the clutch assembly 16 to the rotor 12. The drive sleeve, rotating knife, and aft rotor support rotate with the rotor when the rotor is rotating. The clutch gear assembly 34 is electrically actuatable by the solenoid 36. Actuation of the clutch gear assembly 34 by the solenoid 36 moves the clutch gear 40 to the extended position whereby the drive teeth 52 of the clutch gear 40 are engaged with the crowns 45 of the rotating drive sleeve 38 to cause the clutch gear 40 to rotate with the drive sleeve 38 so that the clutch gear 40 can drive the feeder delinker 15.

The conventional solenoid 36 is secured to the clutch housing 27. The solenoid 36 includes a solenoid housing 67, a plunger 68, and a spring 69. The plunger 68 extends partially out of the solenoid housing 67. The spring 69 is arranged in the solenoid housing 67 to urge the plunger 68 partially out of the solenoid housing. The plunger 68 is pivotably connected to the actuation arm 32. The actuation arm 32 is pivotably connected to the clutch housing 27 and the clutch shift 29. The solenoid 36 is configured to magnetically pull the plunger 68 into the solenoid housing 67 and thereby retract the plunger 68 when the solenoid is electrically activated. Retraction of the plunger 68 pivots the actuation arm 32 about a pivot pin 71 to move the clutch shift 29 longitudinally rearward R within the clutch housing 27. Rearward movement of the clutch shift 29 within the clutch housing causes a blade 72 on the clutch shift 29 to interface with the knives 61 on the rotating knife 41 (e.g., when the rotating knife is rotating with the drive sleeve) and cam the rotating knife 41 and attached clutch gear 40 longitudinally forward F along the drive sleeve 38 until the drive teeth 52 of the clutch gear 40 are engaged by the crowns 45 on the drive sleeve 38 to cause the clutch gear 40 to rotate with the drive sleeve 38.

A locating tab 74 protruding from a locating ring 73 connected to the rear of the clutch housing 27 extends along the exterior of the clutch assembly 16 and rotor housing 11 to two protrusions 76 on the rotor housing. Engagement of the two protrusions 76 by the locating tab 74 prevents the clutch assembly 16 from rotating with the rotor 12 during discharge of the minigun 10.

In operation, depressing the trigger 75 of the conventional minigun 10 causes the GCU 18 to provide power from the external power system 19 to the drive motor, the solenoid 36, and the booster motor 24 to initiate the firing sequence. The drive motor 14 initiates rotation of the rotor 12 and barrel assembly 13. The solenoid 36 activates to engage the clutch gear 40 with the drive sleeve 38. The drive sleeve 38 transfers rotary motion from the rotor 12 to the clutch gear 40, which in turn rotates the drive gear 59 of the feeder-delinker 15. The booster motor 24 begins advancing linked ammunition from the ammunition canister 23 through the feed chute 9 and into the feeder delinker 15. The rotating clutch gear 40 causes the feeder-delinker 15 to exert a pulling force on the linked ammunition provided by the booster motor 24. The feeder-delinker 15 then provides delinked ammunition to the bolt assemblies which fire each round and discard spent ammunition casings.

When the trigger 75 is released, power to the solenoid 36, the booster motor 24, and the drive motor 14 is cut off. The solenoid 36 deactivates immediately upon cessation of power. Deactivation of the solenoid allows the spring 69 in the solenoid 36 to push the plunger 68 partially back out of the solenoid housing 67, which pivots the actuation arm 32 to move the clutch shift 29 longitudinally forward F within the clutch housing 27. The blade 72 on the clutch shift 29 then interfaces with the still rotating knives 61 on the rotating knife 41 to cam the rotating knife 41 and attached clutch gear 40 longitudinally rearward R along the drive sleeve 38 until the drive teeth 52 on the clutch gear disengage from the crowns 45 on the drive sleeve. This ceases rotation of the clutch gear 40 with the drive sleeve 38. The positioner spring 37 assists disengagement of the drive teeth 52 from the crowns 45 by simultaneously pushing the clutch gear 40 and rotating knife 41 rearwardly along the drive sleeve 38.

Upon disengagement of the clutch gear from the drive sleeve, the lugs 58 on the clutch gear 40 contact the arcuate projections 31 and the drive block 46 contacts the anti-rotating slide 30 to halt rotation of the clutch gear 40. The resulting cessation of clutch gear rotation in turn ceases rotation of the feeder delinker 15 and thus the feed of ammunition through the rotor housing 11 to the bolts. The booster motor 24 also deactivates and ceases pushing linked ammunition to the feeder delinker 15 shortly after the solenoid 36 deactivates. The main drive motor 14 continues to briefly rotate the rotor 12 after the solenoid 36 and booster motor 24 deactivate so as to fire any ammunition remaining in the bolts and clear the bolts of spent casings before ceasing rotation of the rotor 12. Engagement of the drive block 46 with the anti-rotating slide 30 also "times" the feeder delinker 15 by causing it to position the next round of ammunition away from the rotor and bolts so that the bolts do not contact and thereby discharge or otherwise explode the next round as the rotor spins down.

Immediate cessation of fire upon trigger release is vital to combat operations because continued unintentional discharge is dangerous to personnel and wasteful of limited ammunition supply. Nonetheless, conventional clutch assemblies for rotary machine guns do not reliably and immediately cease fire upon release of the trigger 75 because the positioner spring 37 is not designed to immediately disengage the clutch gear 40 drive teeth 52 from the drive sleeve 38 crowns 45 without the aid of the clutch shift 29, and both of these components are subject to extreme wear. This is especially problematic when the rotary machine gun is pointed downward (e.g., while mounted to a helicopter conducting combat operations) because the weight of the gun alone can hold the positioner spring 37 in compression. This in turn keeps the clutch gear 40 engaged with the drive sleeve 38 and driving the feeder delinker 15 to feed ammunition to the gun until the main drive motor 14 deactivates. Even when continually used in an upright or otherwise level position, the spring positioner 37 does not evenly apply rearward force to the clutch gear 40, which can cause the clutch gear to bind against one side of the drive sleeve 38 due to the resulting increased friction.

The positioner spring 37 is known to wear out relatively quickly, whether by losing spring tension or by becoming brittle and simply snapping off. Similarly, the anti-rotating slide 30, being mounted to the exterior of the clutch housing 27 by a mere spring, is well-known to fall off the clutch housing 27 and break during installation of the conventional clutch assembly 16. The points of the blade 72 on the clutch shift 29 and knives 61 on the rotating knife 41 can become dull. This can delay proper camming engagement of the clutch shift blade 72 with the knives 61 on the rotating knife 41, and thereby prevent the clutch gear 40 from quickly engaging or disengaging from the drive sleeve 38 to start or stop the feeder delinker 15 feeding ammunition to the gun 100. Continued use of a conventional rotary machine gun with dull blades 61, 72 can result in serious and potentially dangerous malfunctions and eventually render the weapon inoperable. Continued operation of a worn clutch assembly which fails to immediately disengage upon trigger release is similarly known to stretch links and cause feed issues.

Additional parts of the clutch assembly subject to heightened wear include the brass bushing 28 in the clutch housing and the locating ring 73 connected to the rear of the clutch housing. Wear of either of these parts can introduce "wobble" or "slop" into a complicated and intricate rotary system that requires precise mechanical interactions to operate smoothly and reliably, which in turn can cause further wear on the clutch assembly 16 and damage various additional components and subassemblies of the gun. Additionally, many of the component parts of the conventional clutch assembly, notably including the clutch housing 27, are not machinable from bar stock. Instead, they must be first cast, then further machined before finishing, which unnecessarily increases manufacturing time and costs.

Accordingly, what is needed are improvements in rotary machine guns and clutch assemblies for rotary machine guns.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention provides novel rotary machine guns and novel clutch assemblies for rotary machine guns that overcome or minimize some or all of the identified deficiencies of the prior art, as will become evident to those of ordinary skill in the art after a study of the information presented in this document.

It is an objective of the present invention to provide a novel clutch assembly for a rotary machine gun that immediately and reliably ceases the feed of ammunition into the gun upon trigger release. Accordingly, in one aspect, the present invention provides a clutch assembly comprising a drive sleeve, a clutch gear, and at least one plunger assembly. The drive sleeve is configured to be mounted to a rotor of the rotary machine gun, and has a forward end and a plurality of crowns at the forward end. The clutch gear is slidably mounted on the drive sleeve. The plunger assembly is on the drive sleeve and configured to urge the clutch gear rearwardly along the drive sleeve away from the plurality of crowns.

It is a further objective of the present invention to provide a novel clutch assembly for a rotary machine gun that is incapable of reversing gear under the weight of a belt of linked ammunition and which reliably times the clutch gear with the feeder delinker without fragile external springs or clips. Accordingly, in another aspect, the present invention provides a clutch assembly comprising a drive sleeve configured to be mounted to a rotor of the rotary machine gun, a clutch housing on the drive sleeve, and clutch gear slidably mounted on the drive sleeve. The drive sleeve has a forward end with a plurality of crowns. The clutch housing includes a plurality of gear stops. The clutch gear is slidably mounted on the drive sleeve and movable along the drive sleeve between an extended position and a retracted position. When in the extended position, the clutch gear engages the plurality of crowns to rotate with the drive sleeve when the drive sleeve is rotating. When in the retracted position, the plurality of gear stops engages the clutch gear from two opposing directions to prevent rotation of the clutch gear about the drive sleeve.

It is yet another objective of the present invention to provide a novel clutch assembly for a rotary machine gun that eliminates or minimizes wearable parts and surfaces, reduces the number of directions in which motion must be transferred during clutch actuation, and which requires minimal mechanical advantage to actuate. Accordingly, in another aspect, the present invention provides a clutch assembly comprising a drive sleeve configured to be mounted to a rotor of the rotary machine gun, a clutch gear slidably mounted on the drive sleeve, a clutch housing in which the rear end of the drive sleeve is received, and a shifter on the clutch housing. The drive sleeve defines a longitudinal axis and includes a rear end and a forward end. The clutch gear has a rear end that defines a circumferential rim. The shifter is configured to engage the circumferential rim and push the clutch gear forward along the drive sleeve toward the forward end of the drive sleeve when actuated.

It is yet another objective of the present invention to provide a novel clutch assembly for a rotary machine gun that includes a more durable and easily machinable housing with a serviceable ball bearing therein to bear the gear assembly and extend the service life of the weapon. Accordingly, in another aspect, the present invention provides a clutch assembly comprising a clutch housing defining an interior space extending from an open front end to an open rear end, an annular ball bearing received in the interior space, a drive sleeve having a rear end received against the bearing in the open front end of the clutch housing, and an aft rotor support received against the bearing through the open rear end of the clutch housing. The aft rotor support is configured to mount the drive sleeve to a rotor of the rotary machine gun and rotate the drive sleeve and the annular ball bearing with the rotor when the aft rotor support is secured to the rotor and the rotor is rotating.

It is yet another objective of the present invention to provide a novel clutch assembly for a rotary machine gun that provides a true "neutral" gear position so as to enable autonomous loading, operation (i.e., firing), and reloading of the rotary machine gun via robotic armatures and allow an operator to safely verify that the machine gun is feeding properly. Accordingly, in another aspect, the present invention provides a clutch assembly comprising a drive sleeve configured to be mounted to a rotor of the rotary machine gun; a clutch housing on the drive sleeve; a clutch gear slidably mounted on the drive sleeve, the clutch gear configured to be engaged with the drive sleeve so as to rotate with the drive sleeve; a shifter on the clutch housing configured to push the clutch gear into engagement with the drive sleeve when the shifter is actuated; and a solenoid assembly. The solenoid assembly comprises a solenoid housing secured to the clutch housing; a plunger in the solenoid housing including an arm extending into the clutch housing, the arm configured to actuate the shifter when the solenoid assembly is electrically actuated; a plunger rod extending from the plunger opposite the arm and out of the solenoid housing; a spring in the solenoid housing configured to urge the plunger and the plunger rod toward the clutch housing; and a shifter actuation lever pivotably connected to the plunger rod outside the solenoid housing, the shifter actuation lever manually pivotable to move the clutch gear along the drive sleeve to a neutral position wherein the clutch gear is rotatable about the drive sleeve in either of two opposing directions until the solenoid assembly is electrically actuated.

Clutch assemblies of the present invention are designed to be mounted to and are compatible with the rotors of existing rotary machine guns using existing mounting bolts native to the legacy machine guns, thereby facilitating ready adaption of these novel clutch assemblies to all existing rotary machine guns.

Numerous other objects, advantages and features of the present disclosure will be readily apparent to those of skill in the art upon a review of the following drawings and description of exemplary embodiments.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

FIG. 8 is another exploded perspective view of the clutch housing and clutch shift of the rotary machine gun of FIG. 1.

FIG. 9 is an exploded perspective view of the clutch gear assembly of the rotary machine gun of FIG. 1.

DETAILED DESCRIPTION

Interpretation and Definitions

Figure 1:
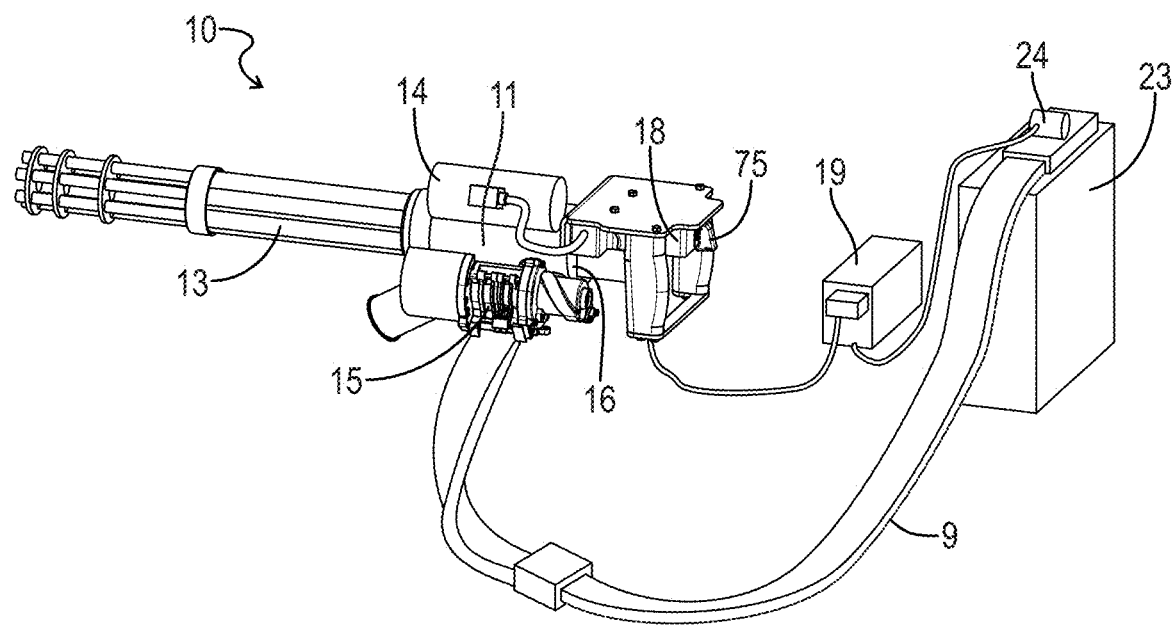
FIG. 1 is an elevated left-side perspective view of a conventional M134 rotary machine gun (i.e., minigun) with an external battery and ammunition canister feeding linked ammunition to the feeder delinker through a flexible feed chute.
Figure 2:
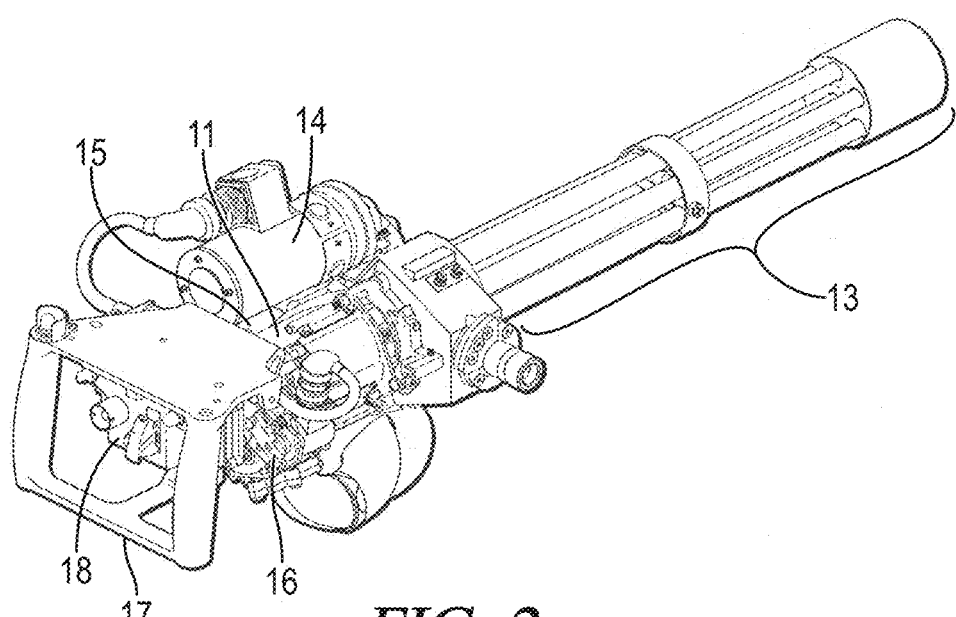
FIG. 2 is an elevated rear right side perspective view of the rotary machine gun of FIG. 1. The battery, ammunition canister, and feed chute are omitted.
Figure 3:
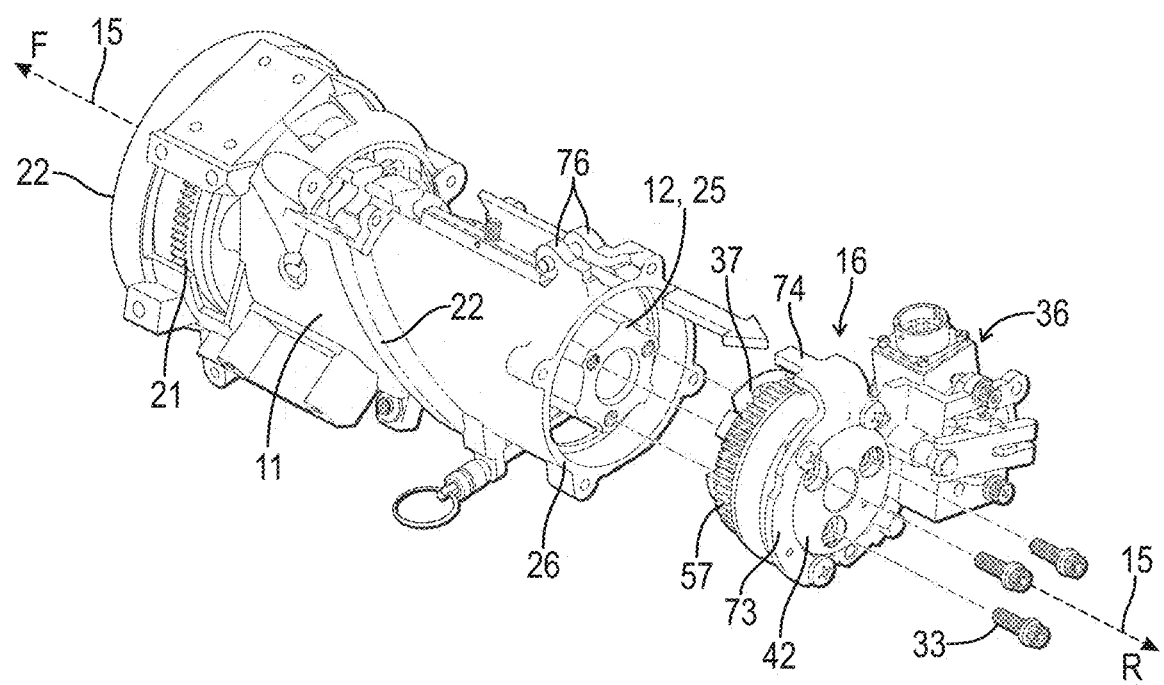
FIG. 3 is a partially exploded, elevated rear left side perspective view of the rotor, rotor housing, and clutch assembly of the rotary machine gun of FIG. 1.
Figure 4:
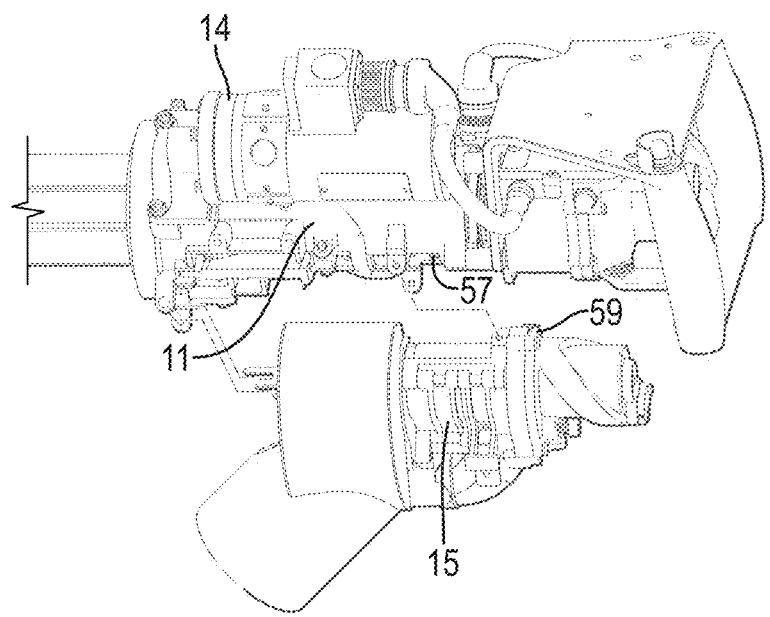
FIG. 4 a partially exploded, elevated left side perspective view of the rotary machine gun of FIG. 2 showing the feeder-delinker positioned for engagement with the clutch gear and attachment to the rotor housing.
Figure 5:
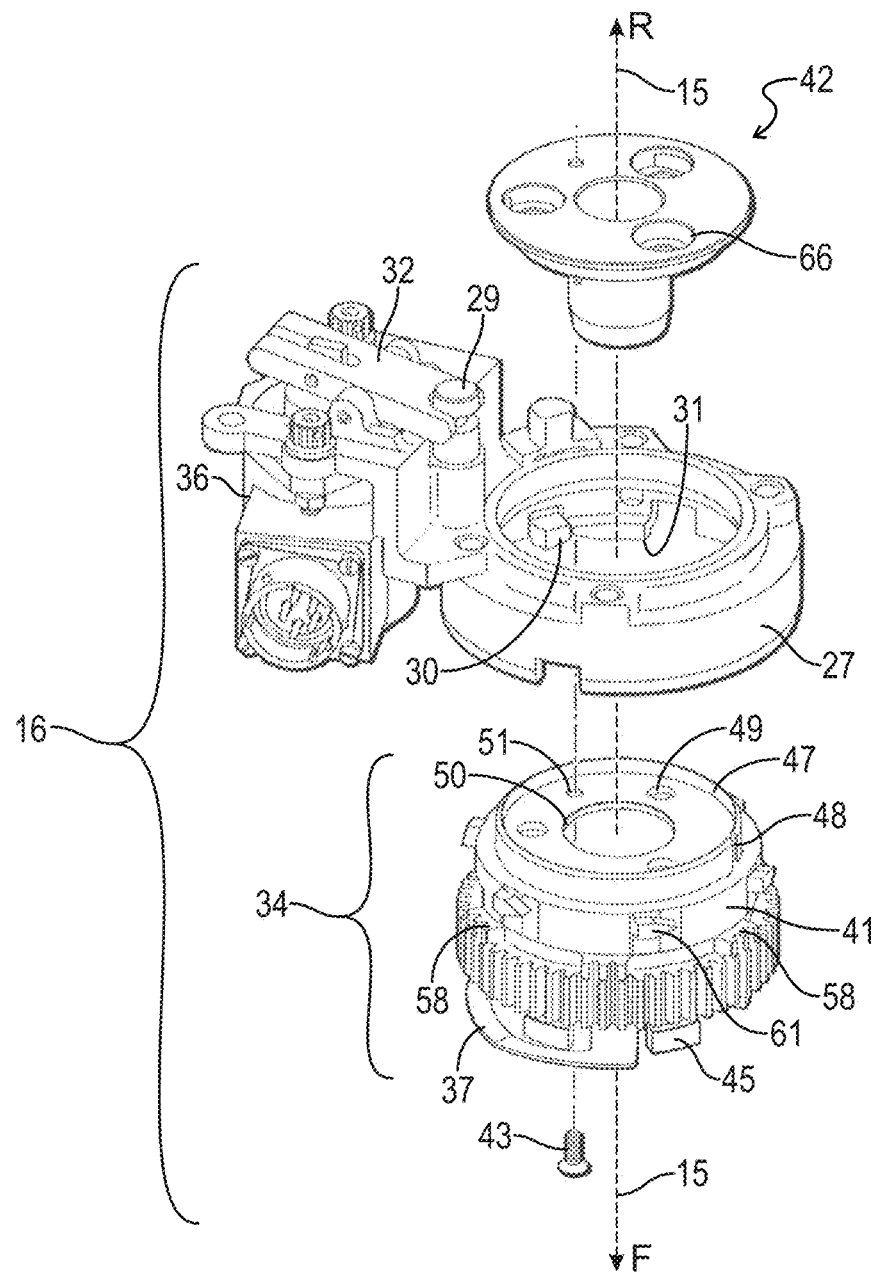
FIG. 5 is a partially exploded perspective view of the clutch assembly of the rotary machine gun of FIG. 1. Rotor bolts are omitted for clarity.
Figure 6:
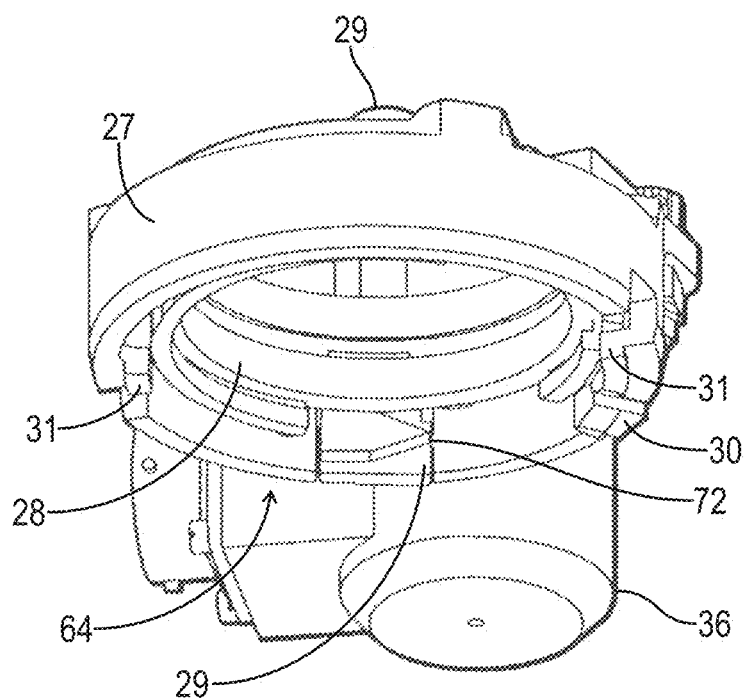
FIG. 6 is a perspective view of the clutch housing with the brass bushing, clutch shift, and the solenoid of the rotary machine gun of FIG. 1.
Figure 7:
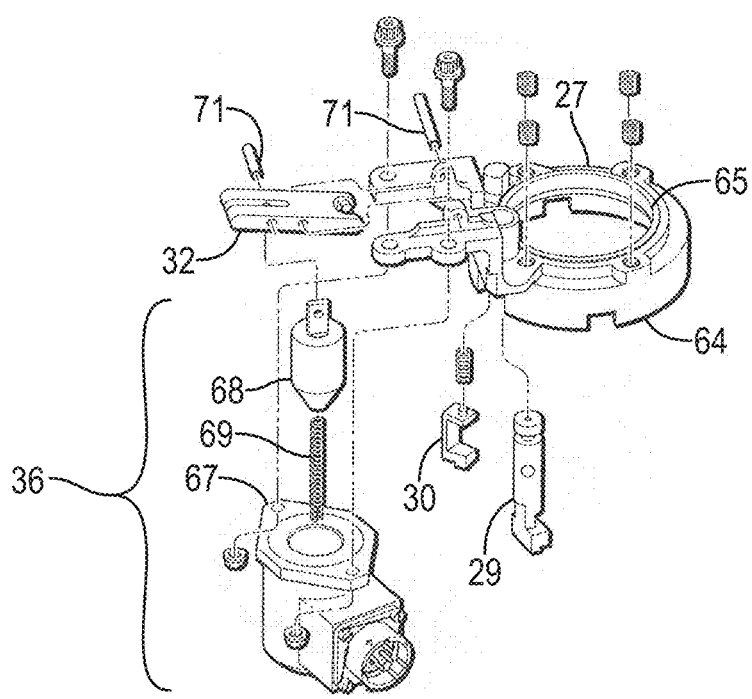
FIG. 7 is a partially exploded perspective view of the objects of FIG. 6.

The details of one or more embodiments of the present invention are set forth in this document. Modifications to embodiments described in this document, and other embodiments, will be evident to those of ordinary skill in the art after a study of the information provided herein. The information provided in this document, and particularly the specific details of the described exemplary embodiment(s), is provided primarily for clearness of understanding and no unnecessary limitations are to be understood therefrom. In case of conflict, the specification of this document, including definitions, will control.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

While the terms used herein are believed to be well understood by one of ordinary skill in the art, a number of terms are defined below to facilitate the understanding of the embodiments described herein. Unless defined otherwise, all technical and scientific terms used herein have the same meaning as commonly understood by one of ordinary skill in the art to which the subject matter disclosed herein belongs. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an "upright" position is considered to be the position of apparatus components while in proper operation or in a natural resting position. The upright position of a rotary machine gun is a generally level firing position. As used herein, the terms "aft," "rear," and "rearward" mean in a direction toward a rear end of a machine gun, while the terms "front" and "forward" mean in a direction extending away from the rear of the machine gun toward the muzzles of the machine gun. In some cases, the term "forward" can also mean forward beyond the muzzle of the machine gun. "Vertical," "horizontal," "above," "below," "side," "top," "bottom," "upper," "lower," and other orientation terms are described with respect to this upright position during operation, unless otherwise specified, and are used to provide an orientation of embodiments of the invention to allow for proper description of example embodiments. A person of skill in the art will recognize, however, that the apparatus can assume different orientations when in use.

The term "when" is used to specify orientation for relative positions of components, not as a temporal limitation of the claims or apparatus described and claimed herein unless otherwise specified.

The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

All references herein to rotational directionality (e.g., clockwise, counter-clockwise, first direction, second direction) refer to the direction of rotation as would be observed from the perspective of an operator standing behind and holding the rotary machine gun in an upright position (e.g., by the spade grip). For example, a gear said to be rotating clockwise would be viewed by the operator as rotating to the operator's right, whereas a gear said to be rotating counter-clockwise would be viewed by the operator as rotating to the operator's left.

As used herein, the term "substantially" means within commonly accepted manufacturing practices and tolerances applicable to the industry or product category to which the subject modified by the term "substantially" belongs.

All measurements should be understood as being modified by the term "about" regardless of whether the word "about" precedes a given measurement.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices disclosed herein, including components thereof, can comprise, consist of, or consist essentially of the essential elements and limitations of the embodiments described herein, as well as any additional or optional components or limitations described herein or otherwise useful.

Generally referring to FIGS. 10 through 21D, there is shown a new M134 rotary machine gun 100 with a novel clutch assembly 116 constructed in accordance with an embodiment of the present invention. The novel clutch assembly includes numerous improved components and subassemblies relative to conventional clutch assembly 16. Although many of the terms used to identify various components and subassemblies of the conventional M134 minigun 10 are also used herein to identify various improved components and subassemblies of the novel clutch assembly 116 and rotary machine gun 100, the use of such terms herein is for the purpose of clarity and should not to be construed as an admission or to otherwise mean that any improved components or subassemblies of the novel clutch assembly 116 and rotary machine gun 100 disclosed herein are themselves conventional or known in the art. For example, the novel clutch assembly 116 includes an improved drive sleeve 138, clutch gear 140, clutch housing 127, aft rotor support 142, shifter 129, and solenoid assembly 136. Some of these improved components and subassemblies include certain structures also found on a related component or subassembly of the conventional clutch assembly or gun so as to enable the novel clutch assembly disclosed herein to function with legacy rotary machine guns. However, in each case, the improved components and subassemblies of the novel clutch assembly omit certain structures found on the related conventional component or subassembly and/or include certain additional novel structures which are completely absent from the prior art. With certain key differences explained in more detail below, installation and operation of a rotary machine gun equipped with a novel clutch assembly 116 disclosed herein will be familiar to operators of currently available rotary machine guns with conventional clutch assemblies.

Overview of Gear Assembly

Turning now to FIGS. 10 through 17, there is depicted a novel rotary machine gun 100 with a novel clutch assembly 116 mounted thereon. The novel clutch assembly 116 includes an improved drive sleeve 138 and an improved clutch gear 140. The drive sleeve 138 houses a plurality of plunger assemblies 200. The clutch gear 140 is rotatably and slidably mounted on the drive sleeve 138. The plunger assemblies 200 interface with the clutch gear 140 through the drive sleeve 138. The drive sleeve 138 with plunger assemblies 200 and mounted clutch gear 140 is received in the forward end 164 of the improved clutch housing 127 against an annular ball bearing 202 that is releasably secured in the clutch housing 127. The improved aft rotor support 142 is received in the rear end 165 of the clutch housing 127 against the ball bearing 202. The improved aft rotor 142 support extends through the clutch housing 127 and the drive sleeve 138. A screw 143 received through the drive sleeve 138 and into the aft rotor support 142 secures the drive sleeve 138, clutch gear 140, and aft rotor support 142 to the ball bearing 202 and thus the clutch housing 127. Three bolts 33 received through the aft rotor support 142, drive sleeve 138, and into the rotor tail 25 secure the improved clutch assembly 116 to the rotor 12 at the rear 26 of the rotor housing 11.

The drive sleeve 138 and aft rotor support 142 rotate with the rotor 12 when the rotor is rotating. An improved locating tab 174 secured to the clutch housing 127 is received between the two protrusions 76 on the rotor housing 11 and prevents the clutch assembly 116 from rotating with the rotor 12. The clutch gear 140 only rotates with the drive sleeve 138 and rotor 12 when the clutch assembly 116 is actuated and the clutch gear 140 is engaged with the drive sleeve 138 as explained below. The novel clutch assembly 116 is electrically or manually actuatable via the improved solenoid assembly 136 secured to the clutch housing 127.

Electrical actuation of the clutch assembly 116 engages the clutch gear 140 with the drive sleeve 138 to transfer rotary motion from the rotor 12 to the clutch gear 140, which in turn drives the feeder-delinker 15. When the clutch assembly 116 is not actuated, the plunger assemblies 200 in the drive sleeve 138 immediately disengage the clutch gear 140 from the drive sleeve 138 and push the clutch gear 140 into engagement with unique gear stops 220 on the clutch housing 127 to arrest rotation of the clutch gear 140 and time the feeder delinker 15.

Drive Sleeve

Referring now to FIGS. 12A, and 14-17, the improved drive sleeve 138 is a hollow cylindrical member defining a central longitudinal axis 20 of the rotary machine gun 100. The axis 20 defines a forward direction F and a rearward direction R. The drive sleeve 138 has a forward end 144 and a rear end 147. The central longitudinal axis 20 extends longitudinally forward F beyond the forward end 144 of the drive sleeve, and longitudinally rearward R beyond the rear end 147 of the drive sleeve. The forward end of the drive sleeve includes a plurality of protruding crowns 145. The rear end of the drive sleeve defines three bolt holes 149, a screw hole 151, and a central aperture 150. The drive sleeve 138 is thus configured to be secured to the rotor 12 of the rotary machine gun 100 in a familiar manner. The drive sleeve 138 is configured to rotate with the rotor 12 when the drive sleeve is properly secured to the rotor 12 with the assembled clutch assembly 116.

The improved drive sleeve 138 includes a plurality of open-sided bores 204 and a corresponding plurality of plunger assemblies 200 housed therein. The plunger assemblies 200, as discussed in more detail below, are configured to urge the clutch gear 140 rearwardly along the drive sleeve 138 away from the plurality of crowns 145 when the novel clutch assembly 116 is assembled and properly secured to a rotary machine gun 100. The bores 204 are formed in a sidewall 206 of the drive sleeve 138 and are spaced equidistantly around an exterior circumferential surface 208 of the drive sleeve 138. The bores extend longitudinally parallel to the central longitudinal axis 20 from the rear end 147 of the drive sleeve toward the forward end 144. The rearmost end 210 of each bore 204 is open at the rear end 147 of the drive sleeve 138. As such, the rearmost end of each bore defines an aperture 210 in the rear end 147 of the drive sleeve 138. The forwardmost end of each bore is closed (i.e., blind) and spaced a distance rearwardly from the forward end 144 of the drive sleeve 138.

Clutch Gear

The improved clutch gear 140 is a generally annular member having a forward end 153 with a plurality of forwardly extending drive teeth 152 configured to engage the plurality of crowns 145 on the drive sleeve 138, a rear end 155 opposite the forward end 153, a plurality of radially extending coupling teeth 157, and a plurality of circumferentially spaced lugs 158 extending rearwardly from the coupling teeth 157. The lugs 158 are spaced equidistantly around a circumference of the clutch gear 140. The clutch gear 140 is configured to be rotatably mounted on the drive sleeve 138. The clutch gear 140 is mounted on the drive sleeve 138 when the drive sleeve 138 is received through a central opening 201 of the clutch gear 140. The clutch gear 140 is slidable forward and rearward along the drive sleeve 138 when the drive sleeve 138 is received in the central opening 201. The drive teeth 152 of the clutch gear 140 are configured to be rotationally engaged by the plurality of crowns 145. The coupling teeth 157 of the clutch gear are configured to mesh with complimentary teeth on a drive gear 59 of a conventional feeder delinker 15 when the novel clutch assembly 116 is assembled and properly secured to a rotary machine gun 100 such that rotation of the clutch gear 140 rotates the feeder delinker gear 59 and thus drives the feeder delinker 15. The rear end 155 of the clutch gear 104 defines a continuous circumferential rim 203. The clutch gear 140 has an annular groove 205 defined in an inner circumferential surface 207 proximate the rear end 155.

Plunger Assemblies

Figure 12A:
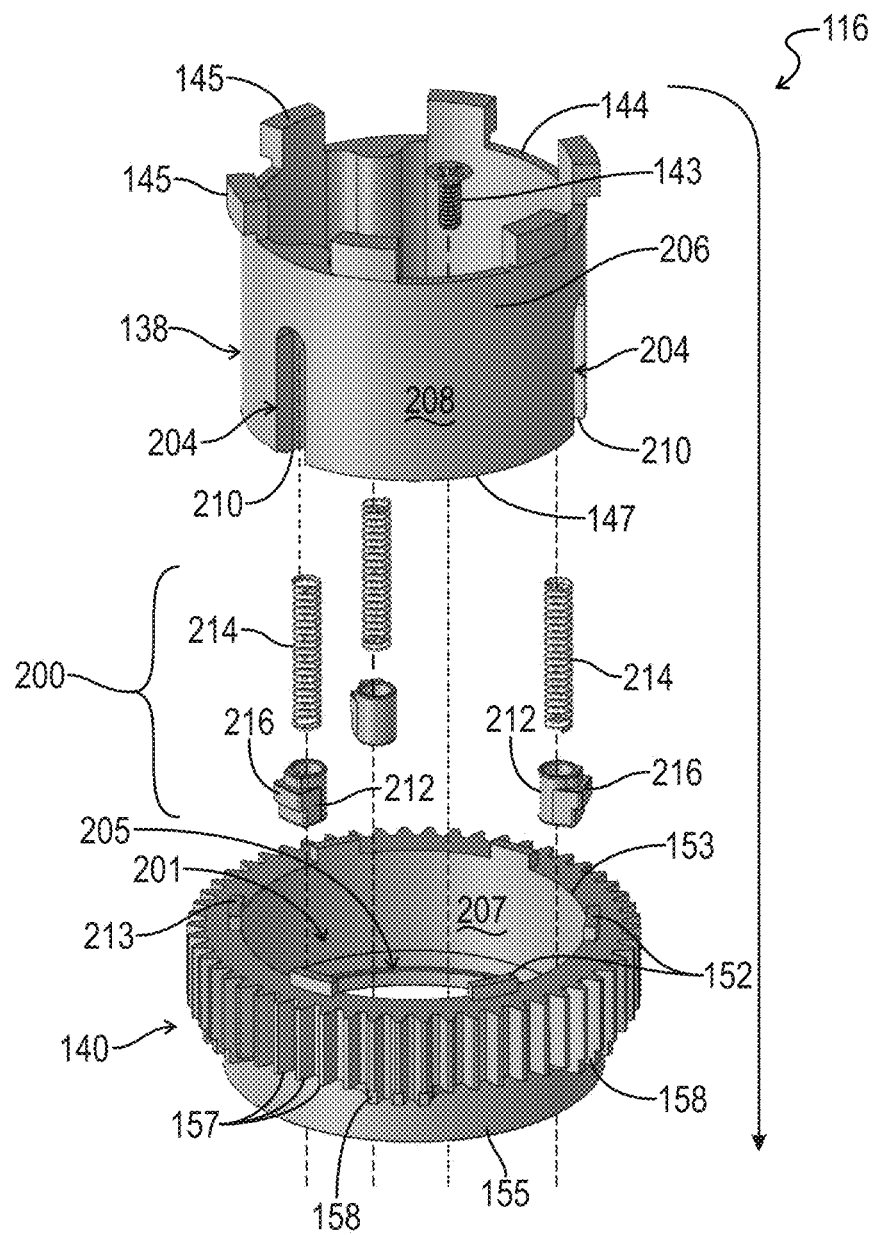
FIGS. 12A and 12B are a partially exploded perspective view of the clutch assembly of FIG. 11. The shifter and three bolts are omitted for clarity.
Figure 17:
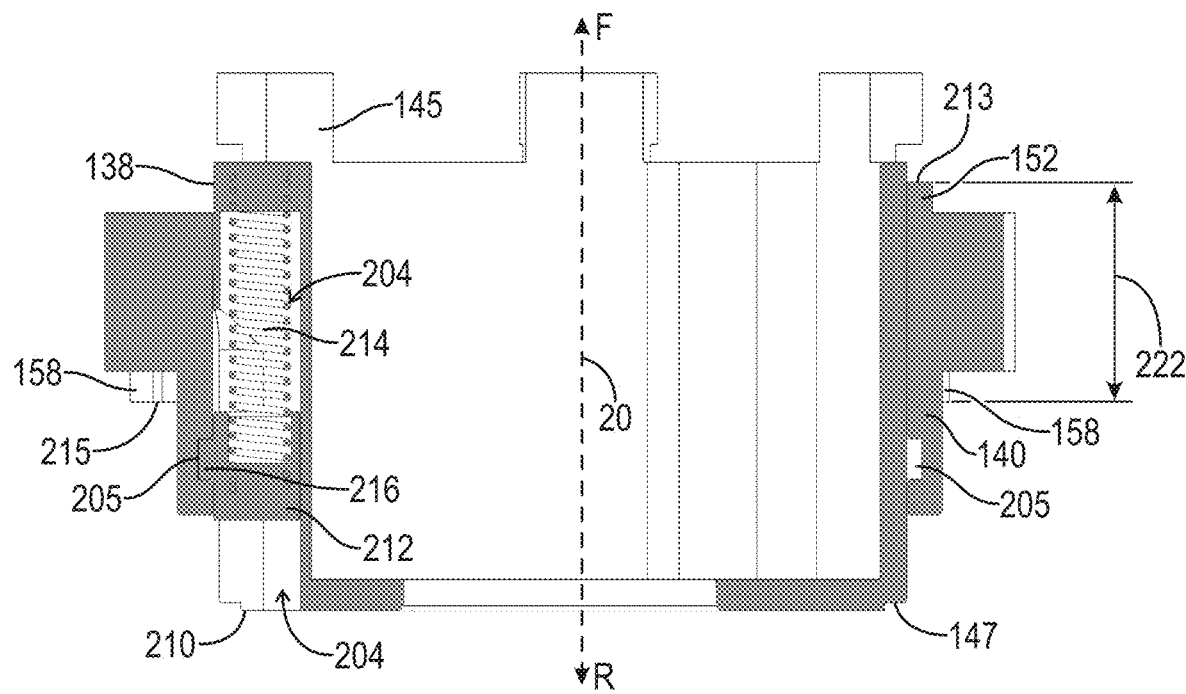
FIG. 17 is a sectional view taken along line 17-17 of FIG. 16.
Figure 18:
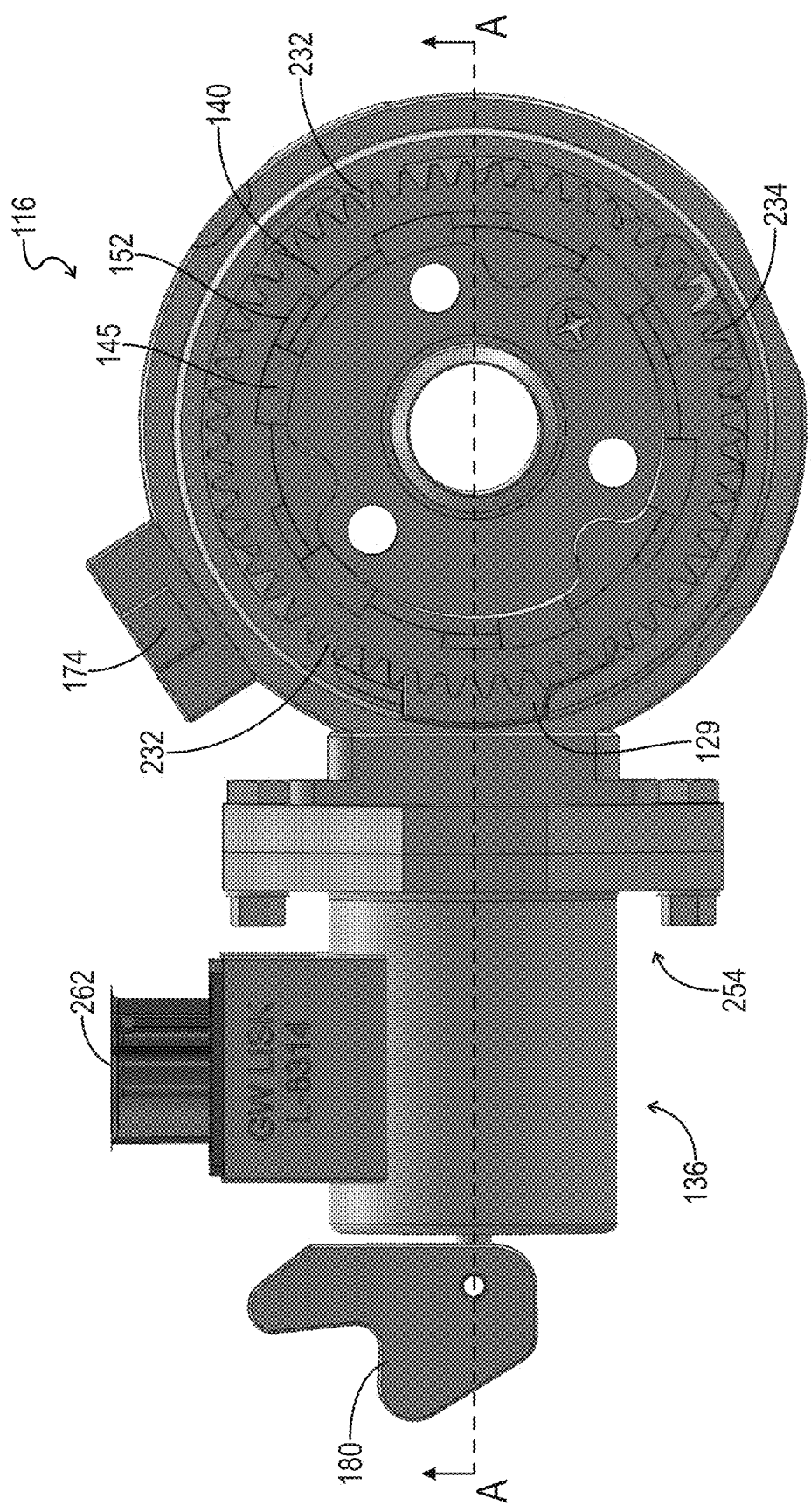
FIG. 18 is a front elevational view of the clutch assembly of FIG. 11.

The plunger assemblies 200 are received in the opened-sided bores 204 on the drive sleeve 138. Each plunger assembly 200 includes a plunger head 212 and a biasing member 214. As best shown in FIGS. 12A and 17, each plunger assembly 200 can be a spring-loaded plunger assembly 200 in which the biasing member is a compression spring 214. However, in other embodiments, the compression springs 214 can be substituted for a different biasing member. Each spring 214 is received in a respective open-sided bore 204 and each plunger head 212 is received in a respective open-sided bore 204 against one of the springs 214. Each plunger head 212 defines a protruding ledge 216. Each ledge 216 protrudes through the open side of the bore 204 at an angle substantially normal to the longitudinal axis 20 and into the annular groove 205 on the clutch gear 140. In this way, the plunger heads 212 are captured in the annular groove 205 and retained in the open sided bores 204 of the drive sleeve 138 by the clutch gear 140.

Consequently, when a compressive force greater than the strength of the springs 214 is applied to the plunger heads 212 (e.g., by electrically actuating or engaging the clutch assembly 116), the springs 214 will compress against the blind forwardmost end of the bores 204. Removal of the compressive force from the plunger heads (e.g., by deactivating or disengaging the clutch assembly 116) causes the springs 214 to decompress and push the plunger heads 212, and thereby the clutch gear 140, rearwardly along the drive sleeve 138 toward the rear end 147 of the drive sleeve 138. In this way, each plunger assembly 200 is configured to apply a continuous rearward R force to the clutch gear 140 so as to push the clutch gear 140 longitudinally rearward R along the drive sleeve 138. The plunger assemblies 200 are designed to be strong enough push the drive teeth 152 of clutch gear 140 out of rotational engagement with the crowns 145 of the drive sleeve 138 in the absence of the compressive force (e.g., when the clutch assembly is not actuated). As such, the plunger assemblies 200 are configured to disengage the clutch gear 140 from the drive sleeve 138 when the clutch assembly 116 is not actuated (e.g., when the rotary machine gun 100 is at rest while the trigger 75 is not depressed).

The innovative plunger assemblies 200 incorporated into the novel clutch assembly 116 disclosed herein are thus configured to apply a continuous rearward force R upon the clutch gear 140 such that disengagement of the clutch gear 140 from the rotating drive sleeve 138 and rearward travel of the clutch gear 140 along the drive sleeve 138 begins instantaneously upon deactivation of the solenoid (e.g., trigger release). This immediately deactivates the feeder delinker 15 to in turn immediately cease the feed of ammunition into the rotary machine gun 100. The use of multiple plunger assemblies 200 spaced around the circumference of the drive sleeve 138 also provides both greater and more evenly distributed force to more reliably, smoothly, and immediately disengage the clutch gear 140 from the drive sleeve 138 than the conventional clutch assembly. It also provides a level of redundancy should one plunger assembly 200 become damaged or fail. In this regard, housing the plunger assemblies 200 in open-sided bores 204 of the drive sleeve 138 and covering them by the clutch gear 140 when the clutch assembly 116 is assembled protects the plunger assemblies 200 from damage and wear caused by, for example, physical concussion and environmental contaminants. Additionally, by omitting the positioner spring 37 of conventional clutch assemblies 16, the plunger assemblies 200 incorporated into the novel clutch assembly 116 disclosed herein eliminate an unreliable wear item and possible point of critical failure.

Clutch Gear Position-Extended

Electric actuation of the novel clutch assembly 116 by the improved solenoid assembly 136 moves the cutch gear longitudinally forward F along the drive sleeve 138 into an extended position at the forward end 144 of the drive sleeve 138. As exemplified in FIGS. 20A-20D, the improved clutch gear 140 is in the extended position, and thus is "engaged with" the drive sleeve 138, when the drive teeth 152 are disposed within the path of rotation of the drive sleeve crowns 145 (i.e., adjacent the crowns) such that the crowns 145 can rotationally engage the drive teeth 152 to cause the clutch gear 140 to rotate with the drive sleeve 138. Put differently, the novel clutch gear 140 is in the extended position when the drive teeth 152 of the clutch gear 140 are positioned for rotational engagement (i.e., actual contact) by the crowns 145 on the drive sleeve 138 when the drive sleeve 138 rotates. A forward surface 209 of the clutch gear 140 can also contact one or more of the rear surfaces 211 of the crowns 145 when the clutch gear is in the extended position. Engagement of the clutch gear 140 with the rotating drive sleeve 138 causes the clutch gear 140 to rotate with the drive sleeve 138 and drive the feeder delinker 15.

The clutch gear 140 is not in the extended position and thus not engaged with the drive sleeve 138 when the drive teeth 152 are not disposed in the path of rotation of the crowns 145, as exemplified in FIGS. 19A-19D and 21A-21D. As such, disengagement of the novel clutch gear 140 from the drive sleeve 138 involves moving the clutch gear 140 longitudinally rearward R along the drive sleeve 138 until the drive teeth 152 are spaced rearwardly from (i.e., behind) the crowns 145 such that the crowns 145 cannot rotationally engage the drive teeth 152 when the drive sleeve 138 rotates (see, e.g., FIGS. 19B and 21B).

Cessation of electric actuation of the novel clutch gear 140 by the improved solenoid 136 assembly allows the plunger assemblies 200 to immediately disengage the drive teeth 152 from the crowns 145 by moving the clutch gear 140 longitudinally rearward R along the drive sleeve 138. Depending on how a shifter actuation lever 270 of the clutch assembly 116 is positioned (discussed in more detail further below), the clutch gear 140 will be moved into either a retracted position near the rear end 147 of the drive sleeve 138 or a true "neutral" position between the retracted and extended positions.

Clutch Gear Position—Retracted

The novel clutch gear 140 is in the retracted position when the drive teeth 152 are spaced longitudinally rearward R from the crowns 145 of the drive sleeve 138 and the lugs 158 on the clutch gear 140 engage gear stops 220 on the clutch housing 127, as exemplified in FIGS. 19A-19E. The gear stops 220 on the clutch housing 127 substantially prevent rotation of the clutch gear 140 by engaging the lugs 158 from two opposing directions (i.e., clockwise Cw and counterclockwise Cc directions of rotation), as best exemplified in FIG. 19E. Importantly, the crowns 145 on the drive sleeve 138 cannot rotationally engage the drive teeth 152 of the clutch gear 140 when the clutch gear 140 is in the retracted position. The clutch gear 140 is timed with the feeder delinker 15 when the clutch gear 140 is in the retracted position.

Clutch Gear Position—Neutral

The novel clutch gear 140 is in the neutral position when the clutch gear is disposed on the drive sleeve 138 longitudinally between the extended and retracted positions such that the clutch gear 140 is freely rotatable about the drive sleeve 138 in either of two opposing directions (i.e., clockwise and counterclockwise) without the drive teeth 152 of the clutch gear contacting the crowns 145 on the drive sleeve or the lugs 158 of the clutch gear contacting the gear stops 220 on the clutch housing, as exemplified in FIGS. 21A-21D. To this end, the novel clutch gear 140 defines a gear width 222 extending from the forwardmost end surface 213 of the drive teeth 152 to the rearmost end surface 215 of the lugs 158. When the clutch assembly 116 is properly assembled and secured to a rotary machine gun 100, the crowns 145 on the drive sleeve 138 are spaced along the longitudinal axis 20 from the gear stops 220 on the clutch housing 127 by a distance greater than the gear width 222. As such, when the clutch gear 140 is in the neutral position, the clutch gear 140 is rotatable about the drive sleeve 138 in either of the clockwise or counterclockwise directions between the plurality of crowns 145 and the at least one gear stop 220 without engaging either the crowns 145 or the at least one gear stop 220. As explained in more detail further below, this innovative feature of the novel clutch assemblies 116 disclosed herein (i.e., the neutral position) advantageously and uniquely enables autonomous loading, operation (i.e., firing), and reloading of rotary machine guns 100 equipped with a novel clutch assembly 116 disclosed herein.

Clutch Housing

Referring now to FIGS. 12B, 13, and 19A-19E, the improved clutch housing 127 is a generally annular member which houses many of the component parts of the novel clutch assembly 116 when assembled. The clutch housing 127 includes a sidewall 224, an open front end 164, an open rear end 165, an interior space 225 extending from the open front end 164 to the open rear end 165, and an annular shoulder 226 on a surface of the sidewall 224 located in the interior space 225 between the open front end 164 and the open rear end 165. In the forward end 164 of the sidewall 224 is defined a notch 228 and a bore 229. The notch 228 can be circumferentially spaced around the open front end 164 of the clutch housing from the gear stops 220 or adjacent a gear stop 220. The bore 229 extends through a portion of the sidewall 224 parallel to the longitudinal axis 20. A non-circular aperture 230 is defined through the sidewall 224 perpendicular to the longitudinal axis 20. The bore 229 extends from the notch 228 to the aperture 230 such that the bore 229 intersects the aperture 230. The clutch housing 127 includes a plurality of gear stops 220 on the forward end 164 of the sidewall 224. The gear stops 220 are configured to engage the lugs 158 on the clutch gear 140 when the clutch gear 140 is in the retracted position to prevent rotation of the clutch gear 140 and time the clutch gear 140 with the feeder delinker 15.

Gear Stops

More specifically, the gear stops 220 can include one or more primary gear stops 232 and one secondary gear stop 234. The primary gear stops 232 are configured to prevent counterclockwise Cc rotation of the clutch gear 140 about the drive sleeve 138. The primary gear stops 232 also pre-stage or "time" the clutch gear 140 for engagement with the feeder delinker 15 by staging of next round for insertion into the rotor housing 11. The secondary gear stop 234 is configured to prevent clockwise Cw rotation (i.e., reversing) of the clutch gear 140 about the drive sleeve 138. This prevents, for example, the weight of the feeder delinker 15 and a belt of linked ammunition therein from rotating the clutch gear 140 in reverse (i.e., clockwise Cw) and thereby pulling it out of time with the feeder delinker 15. In this way, the secondary gear stop 234 functions as an anti-reverse gear stop.

Figure 19A:
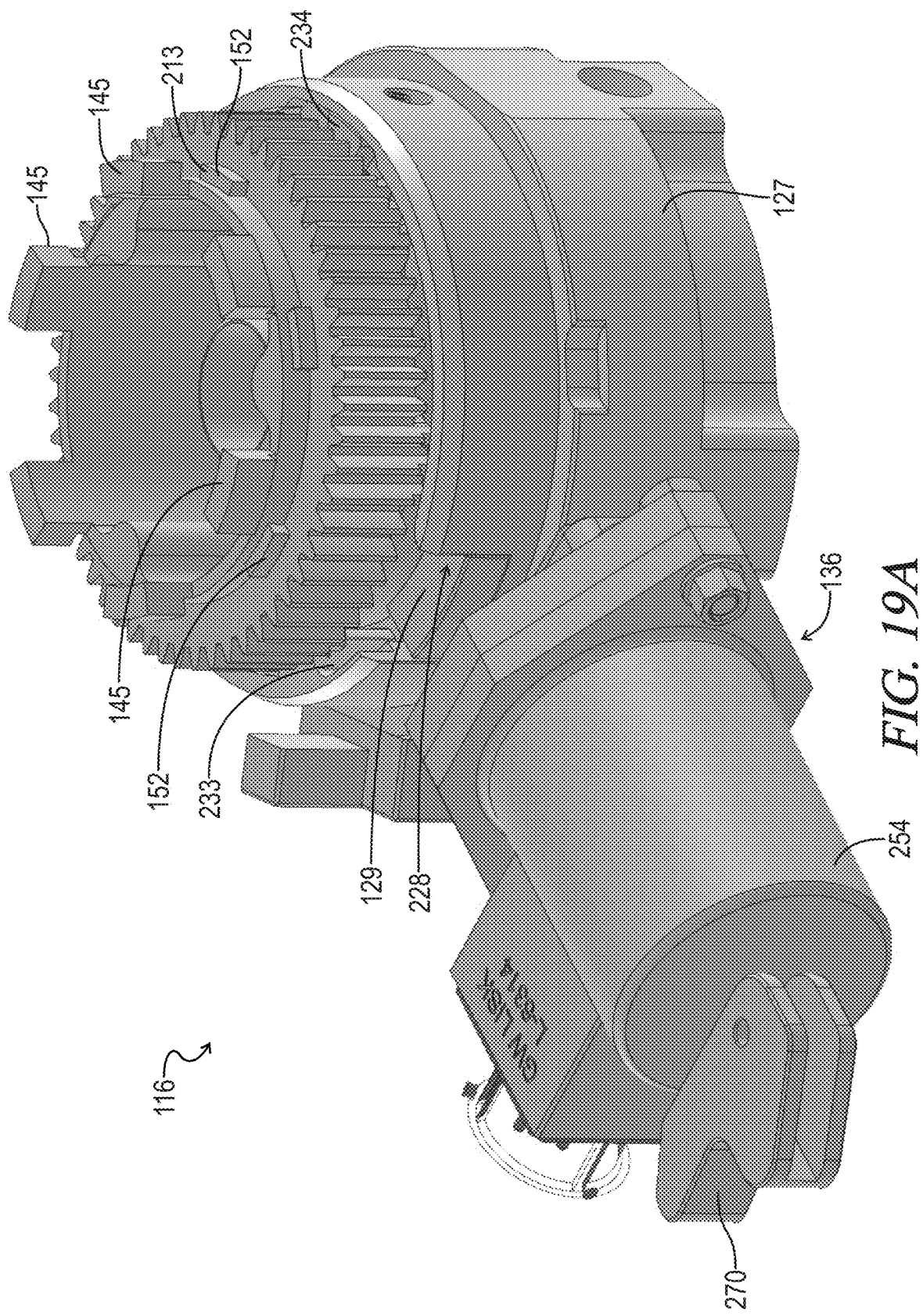
FIG. 19A is a perspective view of the clutch assembly of FIG. 18 showing the clutch gear in the retracted (i.e., "disengaged") position.
Figure 19B:
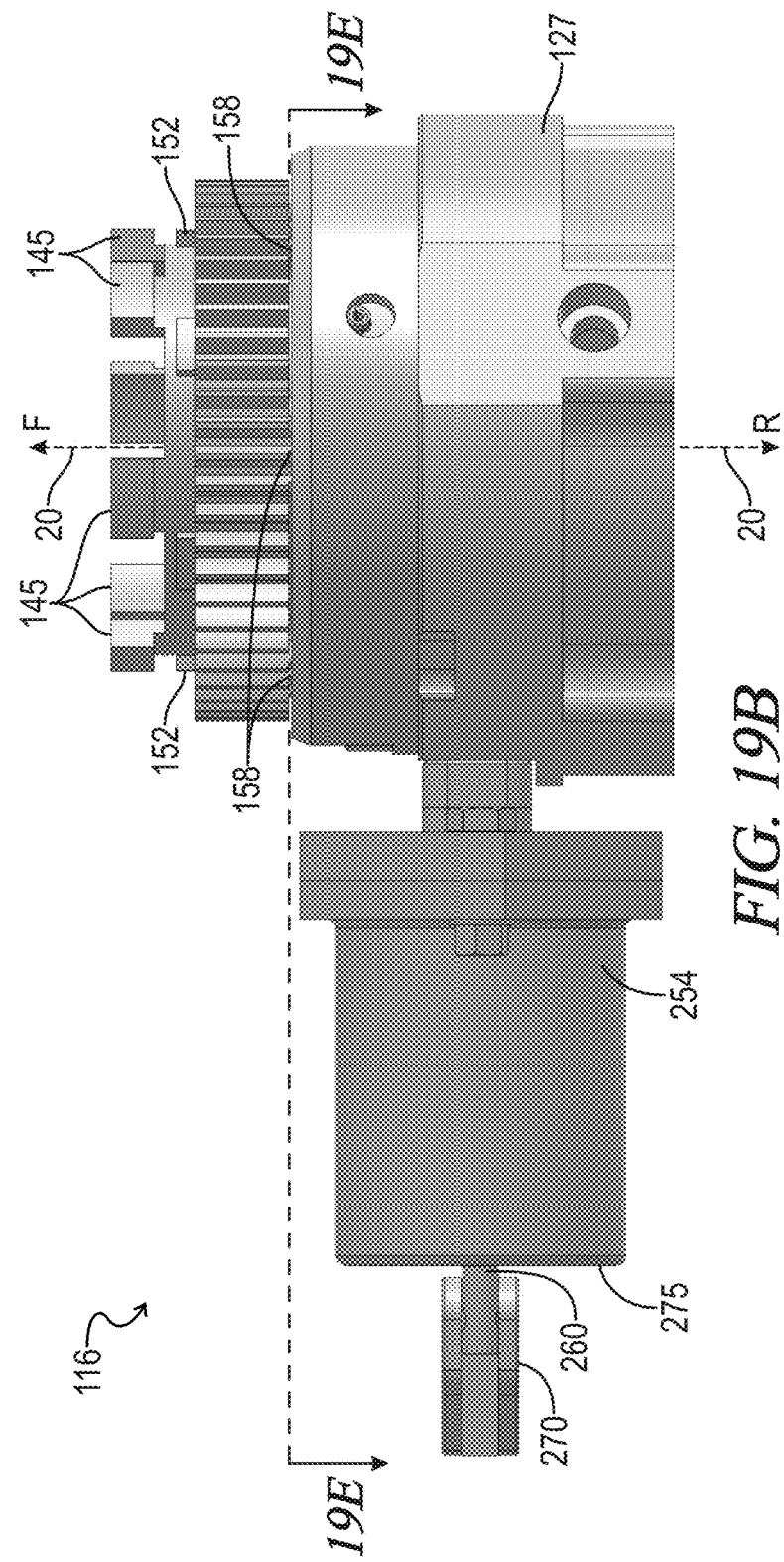
FIG. 19B is a side elevational view of the clutch assembly of FIG. 19A.
Figure 19C:
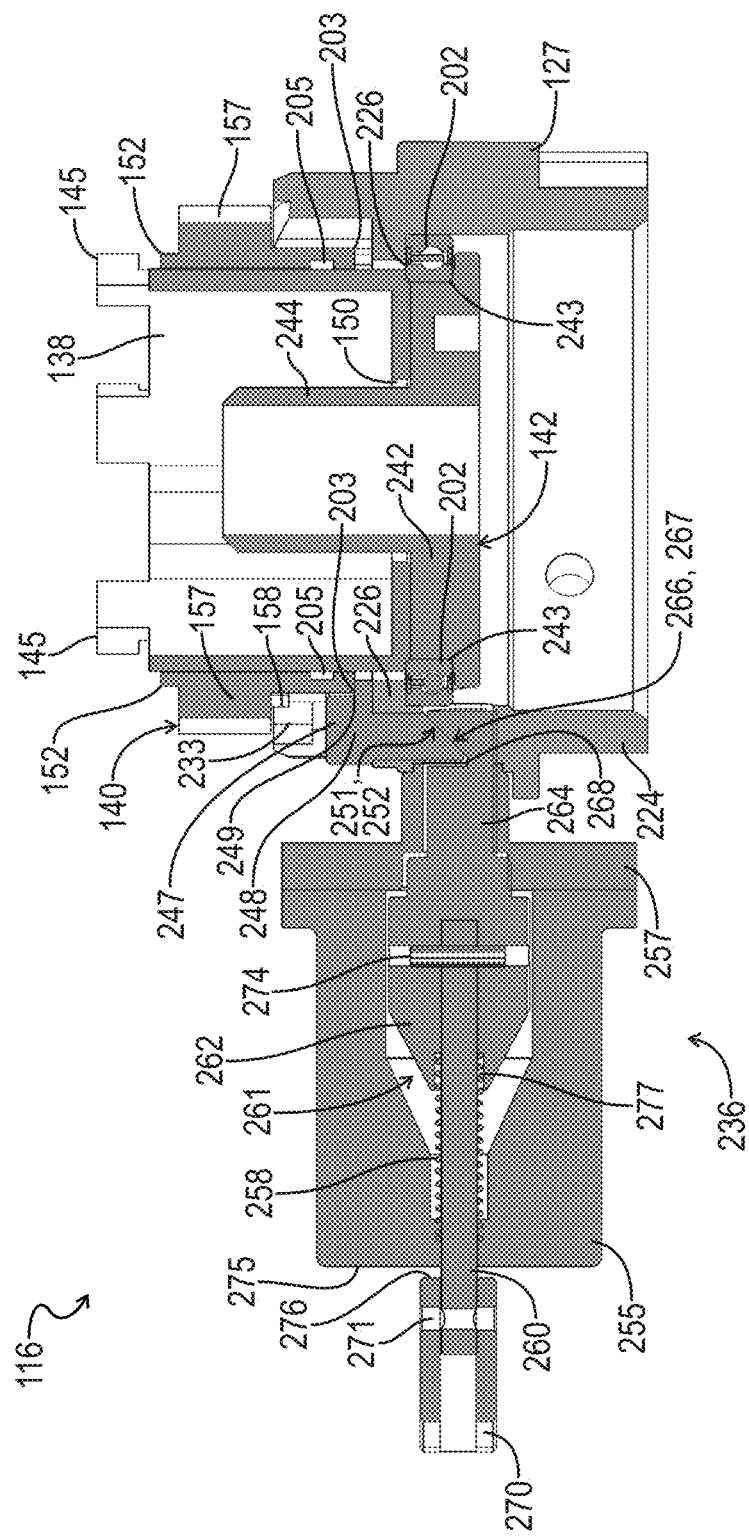
FIG. 19C is a sectional view of the clutch assembly of FIG. 19A taken along line A-A of FIG. 18.
Figure 19D:
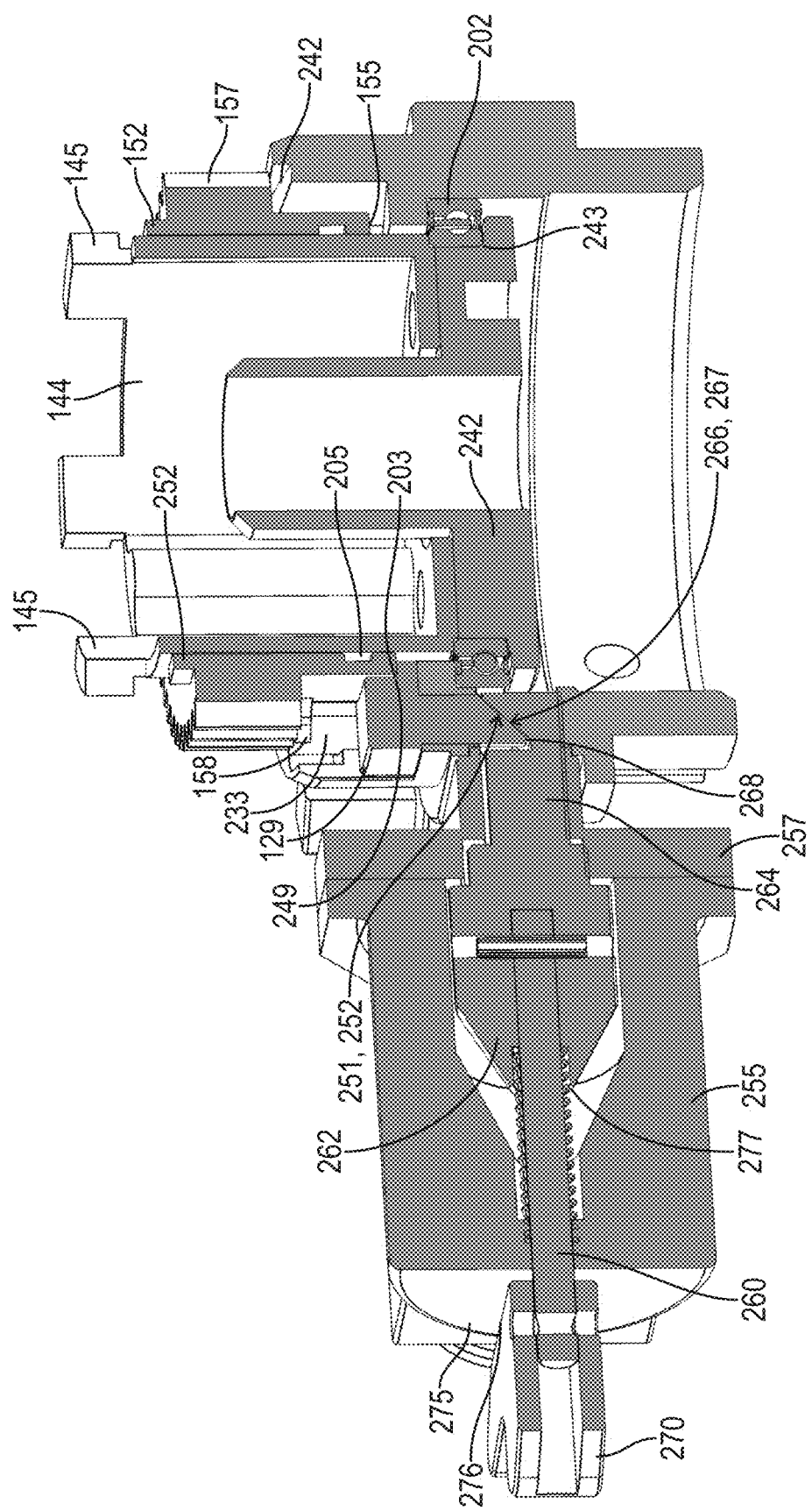
FIG. 19D is a perspective view of the sectioned clutch assembly shown in FIG. 19C.
Figure 19E:
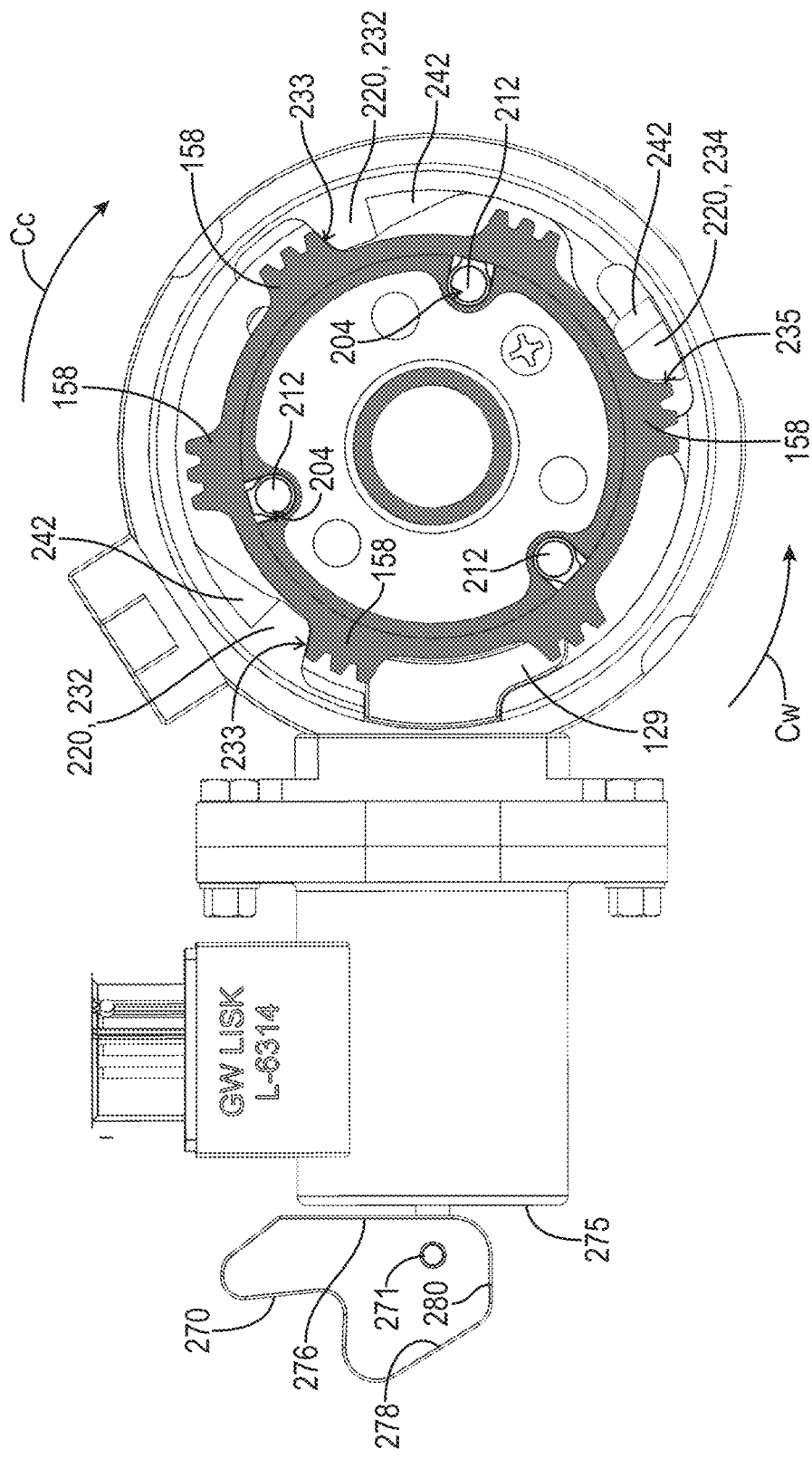
FIG. 19E is a sectional view taken along line 19E-19E of FIG. 19B.
Figure 20A:
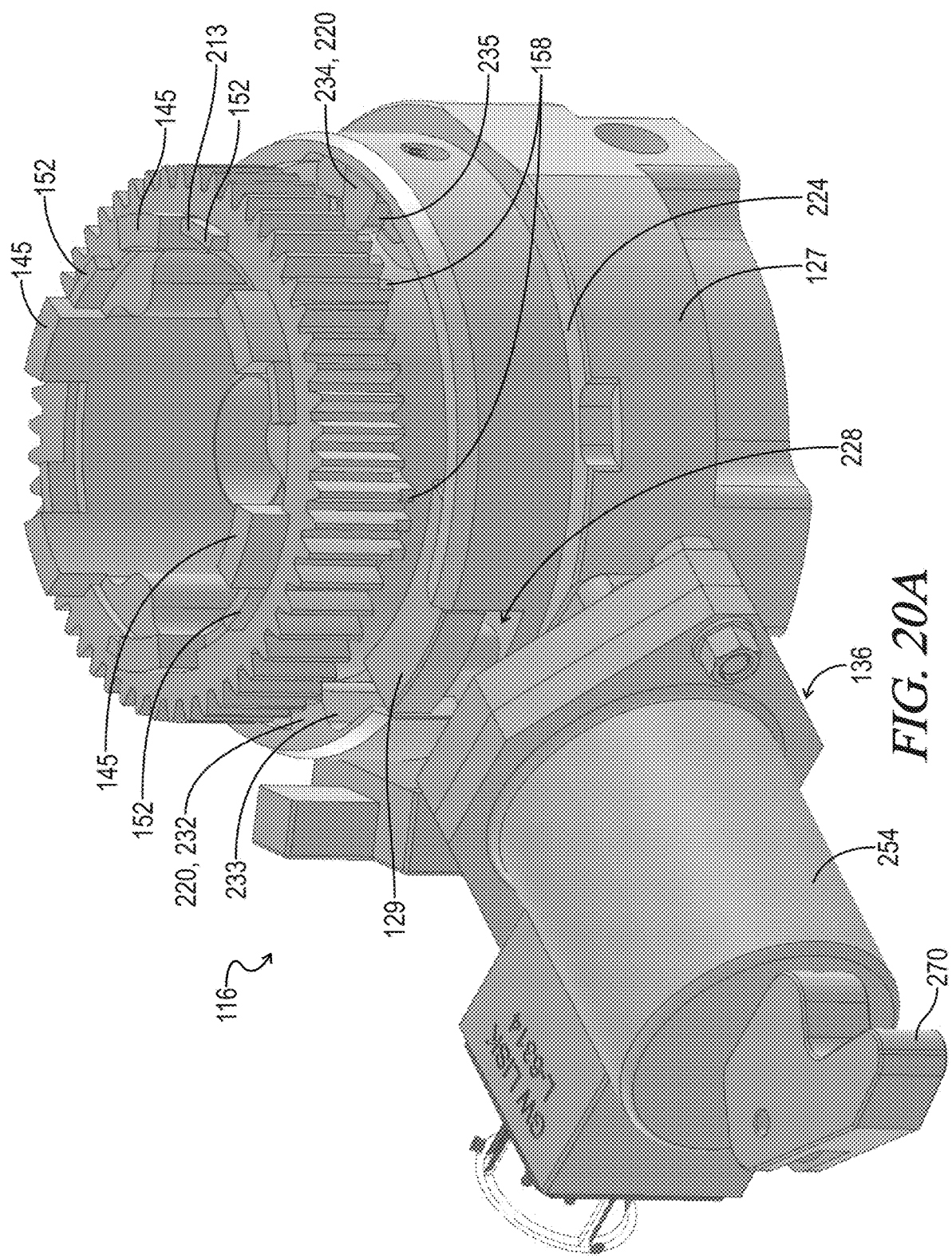
FIG. 20A is a perspective view of the clutch assembly of FIG. 18 showing the clutch gear in the extended (i.e., "engaged") position.
Figure 20B:
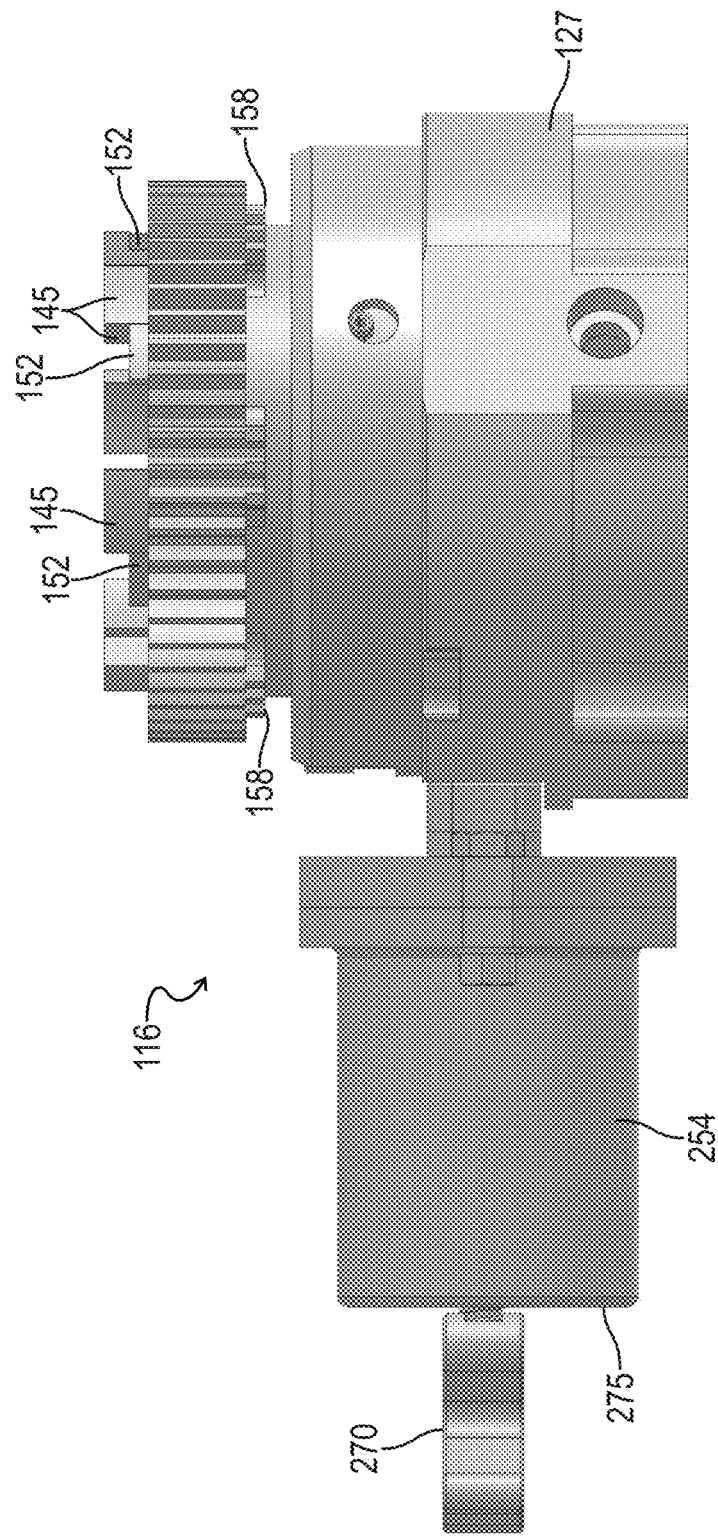
FIG. 20B is a side elevational view of the clutch assembly of FIG. 20A.
Figure 20C:
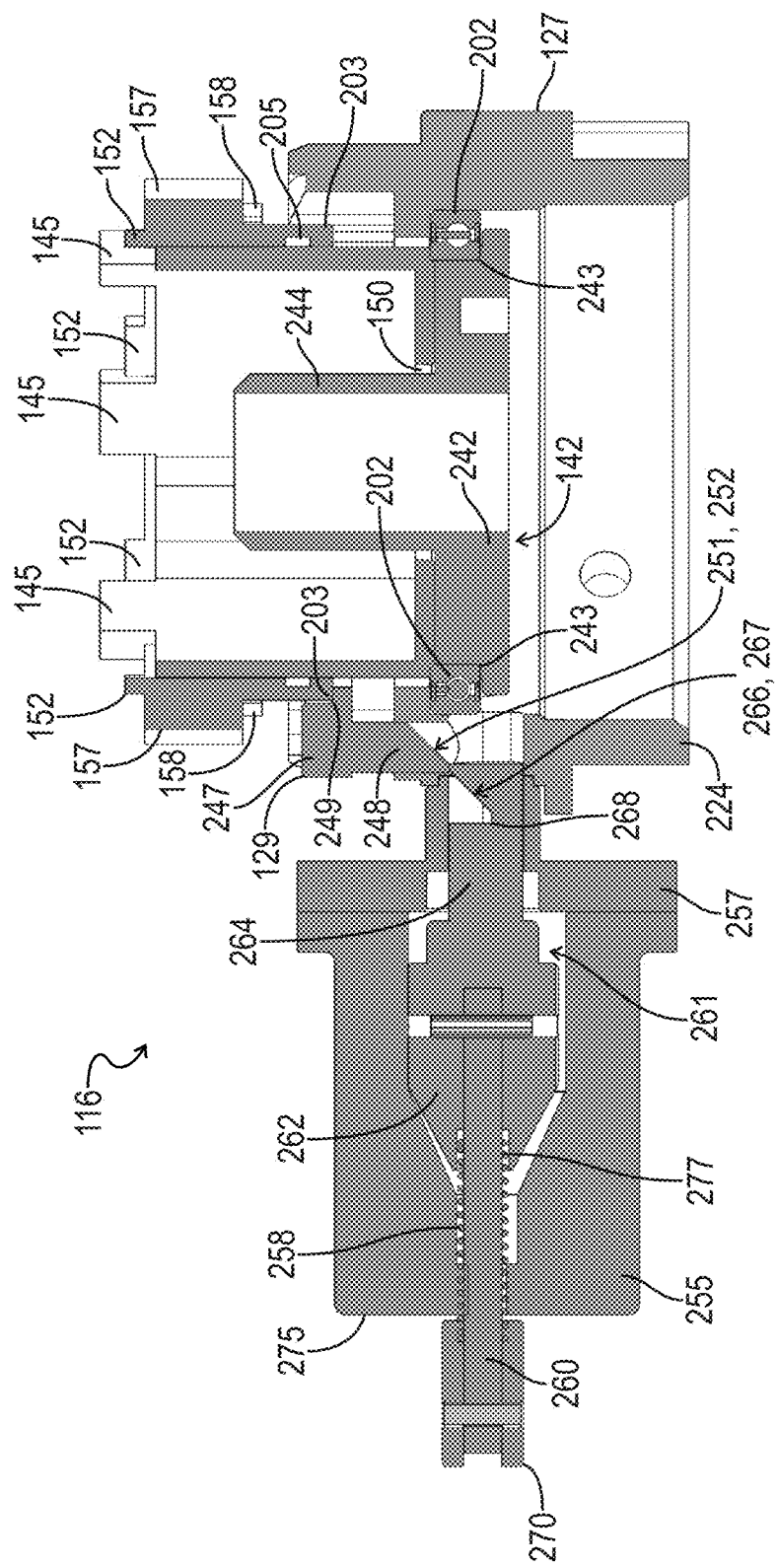
FIG. 20C is a sectional view of the clutch assembly of FIG. 20A taken along line A-A as shown in FIG. 18.
Figure 20D:
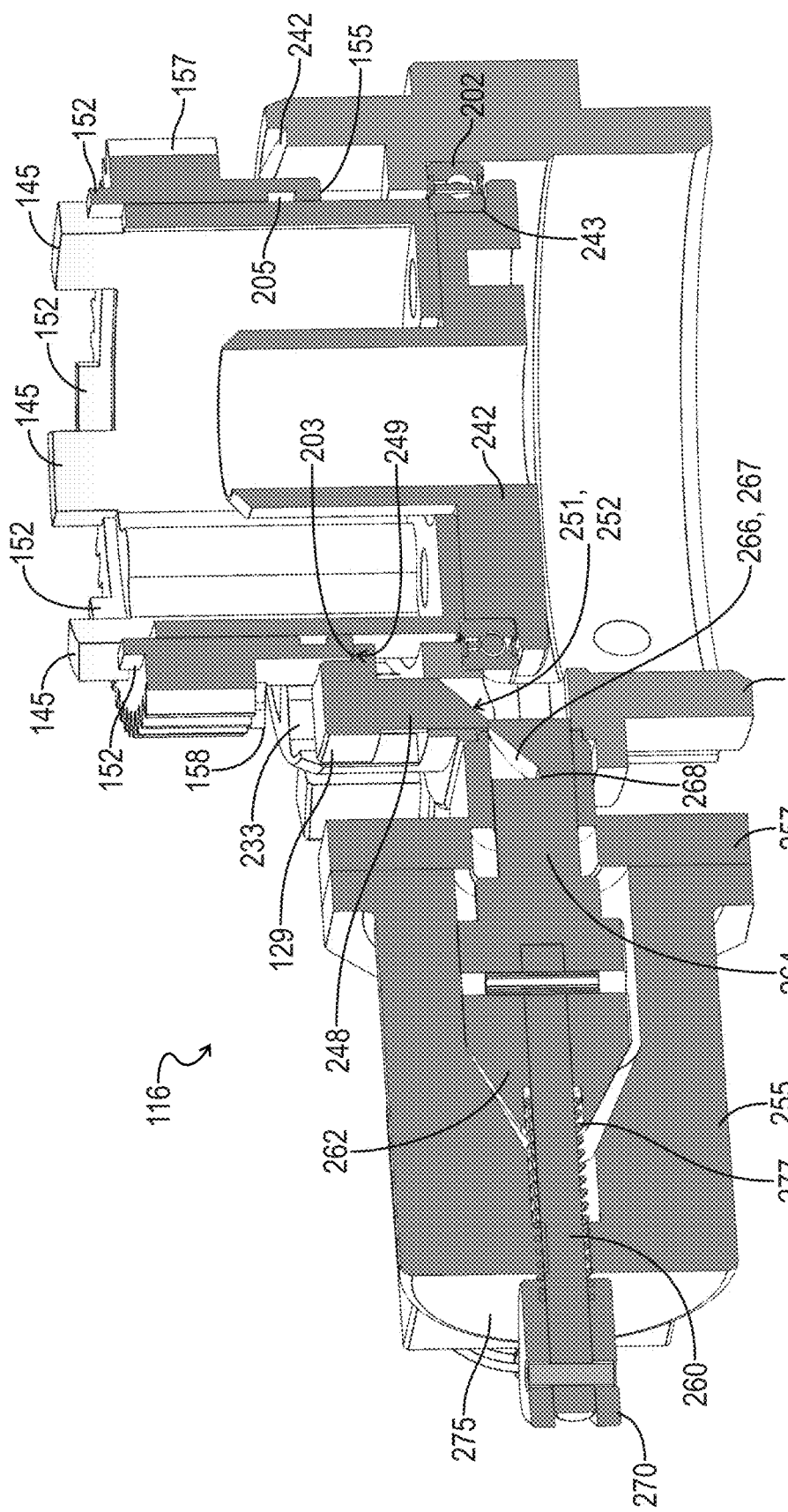
FIG. 20D is a perspective view of the sectioned clutch assembly shown in FIG. 20C.
Figure 21A:
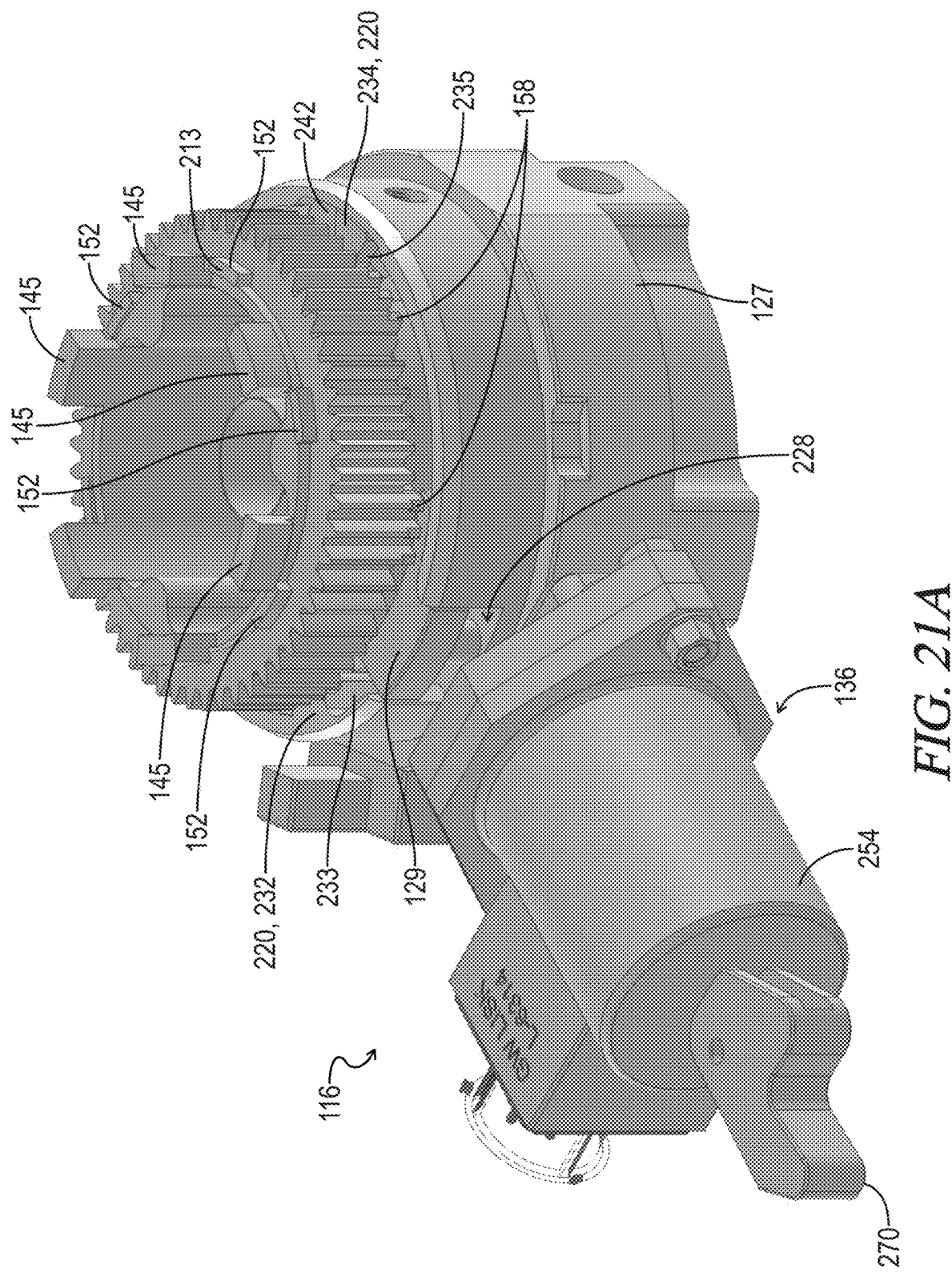
FIG. 21A is a perspective view of the clutch assembly of FIG. 18 showing the clutch in the neutral position.
Figure 21B:
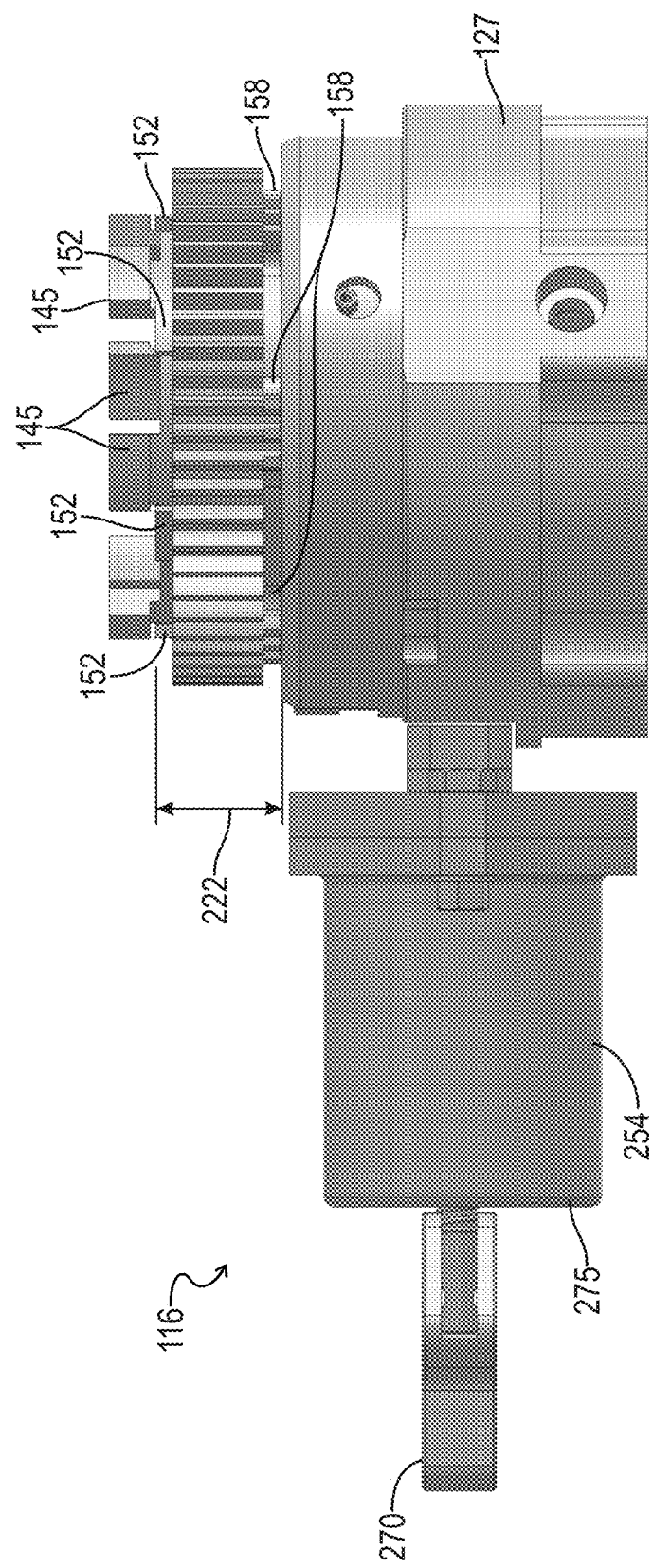
FIG. 21B is a side elevational view of the clutch assembly of FIG. 21A.
Figure 21C:
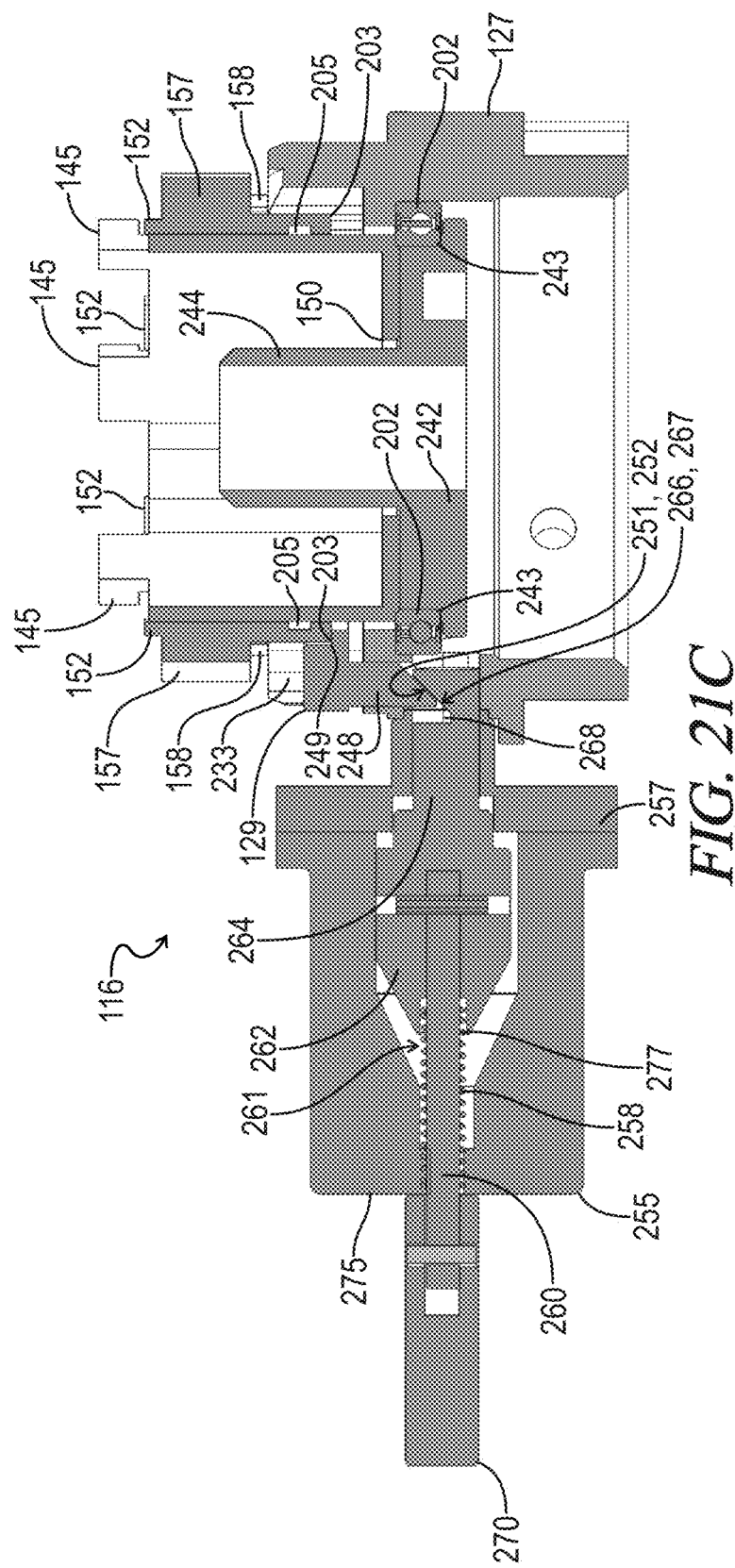
FIG. 21C is a sectional view of the clutch assembly of FIG. 21A taken along line A-A as shown in FIG. 18.
Figure 21D:
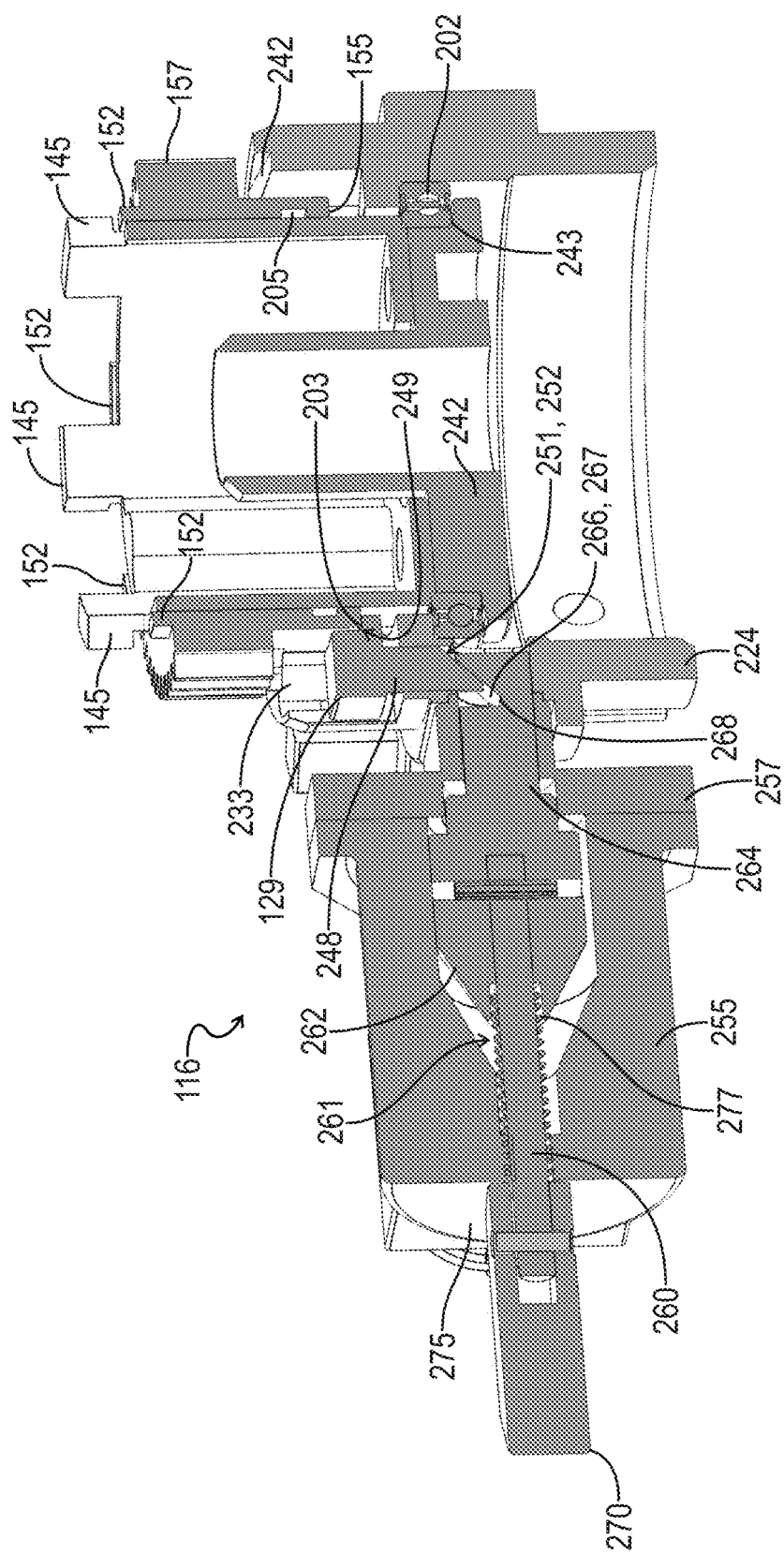
FIG. 21D is a perspective view of the sectioned clutch assembly shown in FIG. 21C.

Each primary gear stop 232 defines a wall 233 configured to engage a respective lug 158 on the clutch gear 140 and thereby prevent counterclockwise Cc rotation of the clutch gear 140. The secondary gear stop 234 defines a wall 235 configured to engage a third lug 158 of the clutch gear 140 and thereby prevent clockwise Cw rotation of the clutch gear 140. The secondary gear stop 234 is arranged on the clutch housing 127 to engage one lug 158 when one of the primary gear stops 232 engages another lug 158. To this end, the wall 233 of each primary gear stop 232 faces the clockwise direction Cw and the wall 235 of the secondary gear stop 234 faces the counter-clockwise direction Cc. The primary and secondary gear stops 232, 234 are spaced around the clutch housing 127 so as to capture two consecutive lugs 158 between opposing walls 233, 235 of the secondary gear stop 234 and one of the primary gear stops 232. As a result, a first of the two consecutive lugs 158 rests adjacent the wall 235 of the secondary gear stop 234 and the second of the consecutive lugs 158 rests adjacent the wall 233 of the primary gear stop 232 that faces the wall 235 of the secondary gear stop 234, as best shown in FIG. 19E. In order to capture two lugs 158 between the secondary gear stop 234 and a primary gear stop 232 and thereby arrest all rotation of the clutch gear 140, the number of lugs 158 on the clutch gear 140 is greater than the number of gear stops 220 on the clutch housing 127 and the gear stops 220 are not spaced equidistantly around the open front end 164 of clutch housing 127.

Figure 12B:
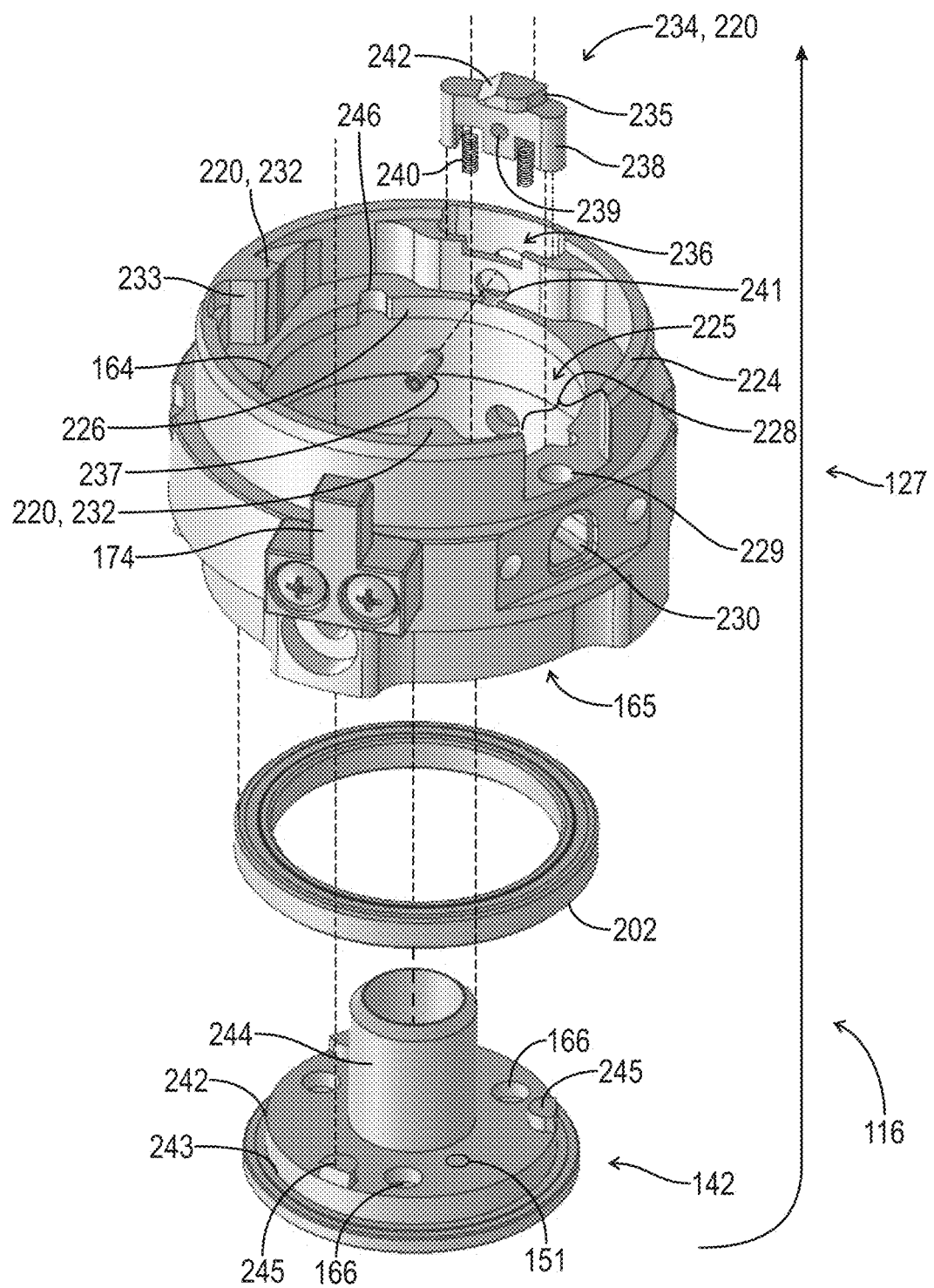

As best shown in FIG. 12B, the secondary gear stop 234 is a spring-loaded pawl 234. The spring-loaded pawl is received in a pocket 236 formed in the sidewall 224 of the clutch housing 127. The spring-loaded pawl 234 is retained in the pocket 236 by a retainer pin 237. The spring-loaded pawl 234 includes a pawl body 238 in which is defined a hole 239, and a pair of springs 240 arranged in the pocket 236 to bias the pawl body 238 out of the pocket 236 forwardly F along the longitudinal axis 20. Two facing holes 241 are defined in the sidewall 224 at the pocket 236. The retainer pin 237 is received through the hole 239 in the pawl body and both facing holes 241. The retainer pin 237 is retained in the hole 239 in a friction fit. As such, when the spring-loaded pawl 234 is compressed, the retainer pin 237 rides down with the pawl body 238 a short distance inside the pocket 236 and the two facing holes 241 without exiting the hole 239 in the pawl body 238. The pawl body 238 includes an inclined surface or ramp 242 opposite the wall 235. The ramp 242 works in combination with the springs 240 to allow lugs 158 on the clutch gear 140 to compress the pawl body 238 into the pocket 236 and thereby rotate in the counterclockwise Cc direction over the pawl body 238 when the clutch gear 140 is moving into the retracted position under rotational inertia (i.e., moving longitudinally rearward R along the drive sleeve 138 while still rotating counterclockwise Cc). This prevents the secondary gear stop 234 from deterring engagement of the lugs 158 with the primary gear stops 232.

Referring again to FIG. 12B, the primary gear stops 232 are static (i.e., rigid) gear stops 232. The primary gear stops 232 are spaced around the forward open end 164 of the clutch housing 127 so as to time the clutch gear 140 with the drive gear 59 of the feeder delinker 15 when the clutch gear 140 is in the retracted position. Each primary gear stop 232 includes a ramp 242 at an end thereof opposite the wall 233 to facilitate rearward R movement of the clutch gear 140 into the retracted position. Specifically, upon cessation of fire and electrical actuation of the solenoid assembly 136, the clutch gear 140 moves longitudinally rearward R along the drive sleeve 138 toward the retracted position while continuing to rotate counterclockwise Cc about the drive sleeve 138. The ramps 242 on each primary gear stop 232 encourage the lugs 158 on the clutch gear 140 to "ride down" the ramps 242, rather than halt against the forwardmost surface of the gear stops 232, as the clutch gear 140 moves rearward R into the retracted position. In this way, the ramps 242 enable the gear stops 220 to use the rotational inertia of the clutch gear 140 to move it rapidly into the retracted position.

The novel clutch housing 127 with integrated gear stops 220 overcomes certain deficiencies of the conventional clutch housing 27 by providing a more durable and easily machinable clutch housing 127 that can be bar-fed and machined out of a single piece of billet easily and inexpensively. The use of a spring-loaded pawl 234 as a secondary gear stop 220 housed in the sidewall 224 of the clutch housing 127 instead of an externally mounted and fragile, conventional anti-rotating slide 30 similarly provides a more durable and reliable mechanism for preventing the clutch gear 140 from reversing out of time with the feeder delinker 15.

Figure 10:
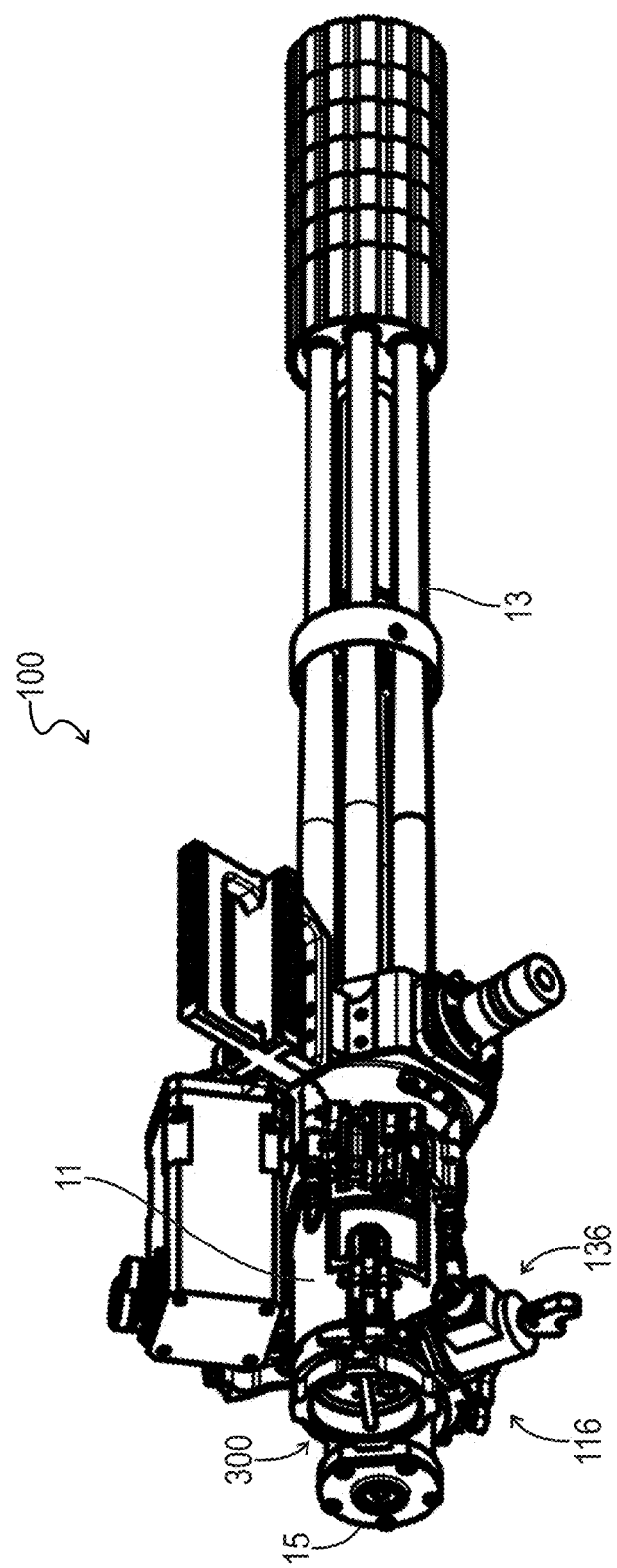
FIG. 10 is a rear right side perspective view of a new M134 rotary machine gun including a novel clutch assembly constructed in accordance with an embodiment of the present invention mounted thereon. The spade grip, gun control unit, ammunition canister, external battery, and feed chute are omitted for clarity.

In some embodiments, a novel clutch housing 127 disclosed herein can include a quick detach spade grip attachment assembly 300 disclosed in U.S. Patent Application Publication No. 2023/0258422 connected to or integrally formed on the rear end 165 of the clutch housing 127, as exemplified in FIG. 10.

Ball Bearing and Aft Rotor Support

The improved clutch housing 127 disclosed herein includes an annular ball bearing 202. The ball bearing 202 is removably seated in the interior space 225 against the annular shoulder 226. The rear end of the drive sleeve 138 with clutch gear 140 mounted thereon is received in the interior space 225 through the open front end 164 of the clutch housing 127 against the ball bearing 202. The aft rotor support 142 is received in the interior space 225 through the open rear end 165 of the clutch housing 127 against the ball bearing 202. The annular ball bearing 202 bears the aft rotor support 142 and the drive sleeve 138.

The aft rotor support 142 includes a circular plate 242, a tubular shaft 244 extending from the plate 242, a concave edge 243 around a circumference of the plate 242, and a plurality of semi-circular protrusions 245 spaced around the circumference of the plate 242 at the concave edge 243. The ball bearing 202 is received against the concave edge 243 of the plate 242. The tubular shaft 244 extends through and is received in the central aperture 150 of the drive sleeve 138. The semi-circular protrusions 245 are received in the apertures 210 (i.e., the open ends of the open-sided bores 204) at the rear end of the drive sleeve 138. This aids in the transfer of rotary motion by the aft rotor support 142 from the rotor 12 to the drive sleeve 138, and closes the apertures 210 at the rear end of the open-sided bores 204 in the drive sleeve 138. It also aligns the screw hole 151 and bolt holes 166 in the aft rotor support 142 with the complimentary screw hole 151 and bolt holes 149 in the rear end of the drive sleeve 138.

The screw 143 received through the screw hole 151 in the drive sleeve 138 and the screw hole 151 in the aft rotor support 142 secures the drive sleeve and after rotor support to opposite sides of the ball bearing 202 and captures the clutch gear 140 on the drive sleeve 138 between the clutch housing 127 and the crowns 145 on the front end 144 of the drive sleeve 138. The annular ball bearing 202 bears the aft rotor support 142 and the drive sleeve 138 with clutch gear 140 mounted thereon. The ball bearing 202 advantageously reduces friction while the rotor 12 is rotating the aft rotor support 142 and the drive sleeve 138 during firing. In some embodiments, the ball bearing is an angular contact bearing 202. In one embodiment, the ball bearing is a four-point angular contact thin section bearing 202.

The improved clutch housing 127 also includes a plurality of notches 246 in the annular shoulder 226. The notches 246 enable an operator to use a tool remove the ball bearing 202 from the clutch housing 127 for cleaning, inspection, and repacking. Incorporation of a serviceable ball bearing 202 in the clutch housing 127 advantageously extends the service life of the clutch assembly 116 and reduces the risk of a machine gun being rendered inoperable due to a conventional brass bushing 28 wearing out. The design of the conventional clutch housing 27 inherently lacks sufficient space to incorporate a ball bearing 202 instead of a simple bushing 28, despite that novel clutch housings 127 of the present invention are shorter in length from the front end 164 to the rear end 165.

Shifter

Figure 13:
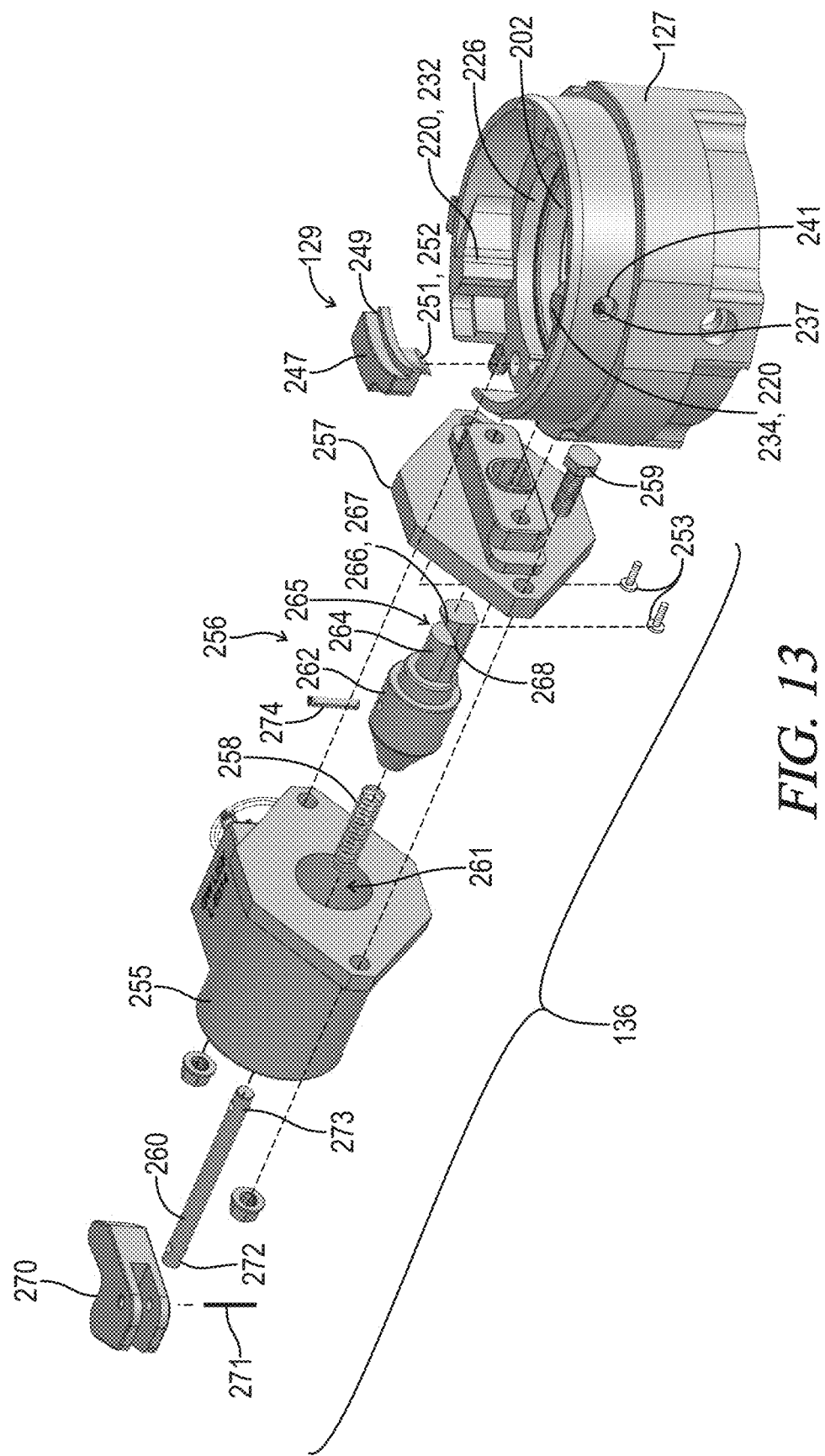
FIG. 13 is a partially exploded perspective view of the solenoid assembly, clutch housing, and shifter of the clutch assembly of FIG. 11.
Figure 14:
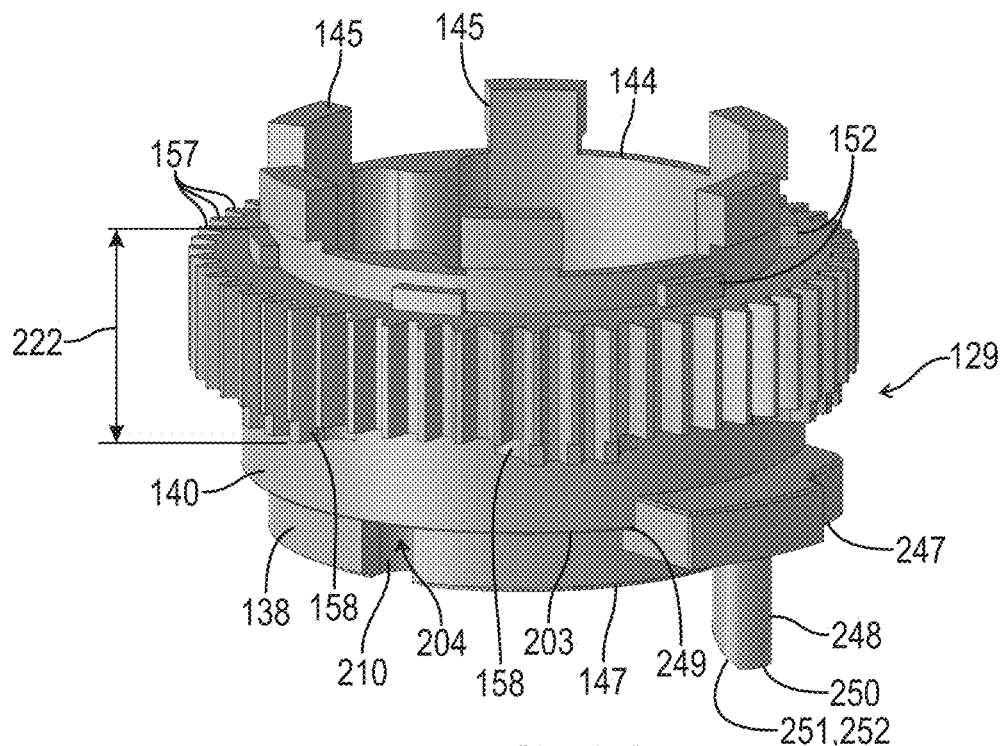
FIG. 14 is a perspective view of the gear assembly of the clutch assembly of FIG. 11.
Figure 15:
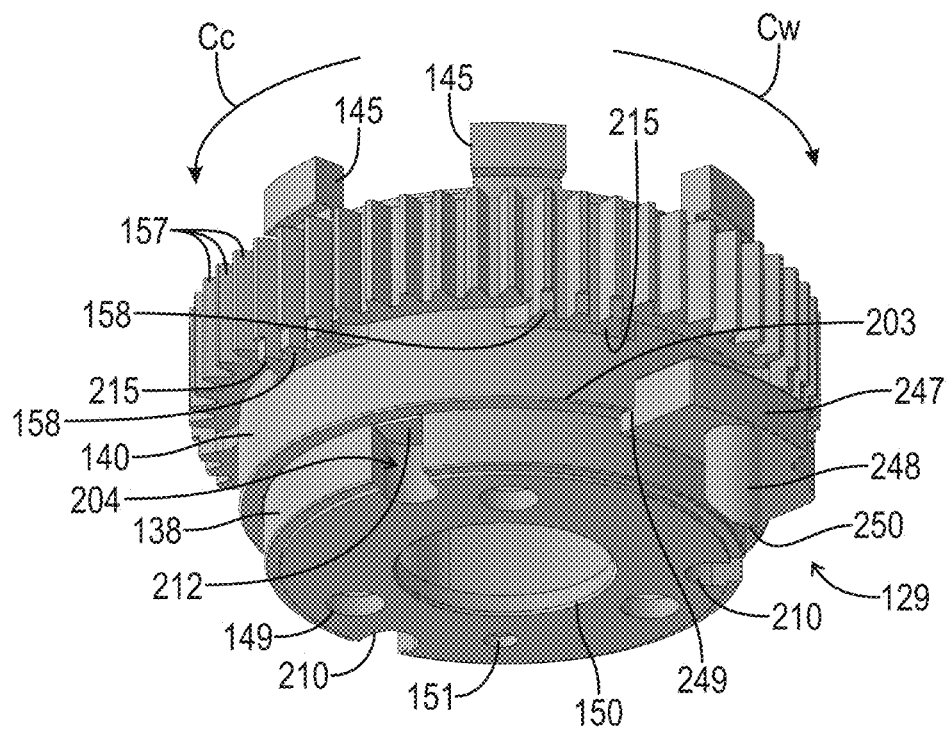
FIG. 15 is another perspective view of the gear assembly of FIG. 14.
Figure 16:
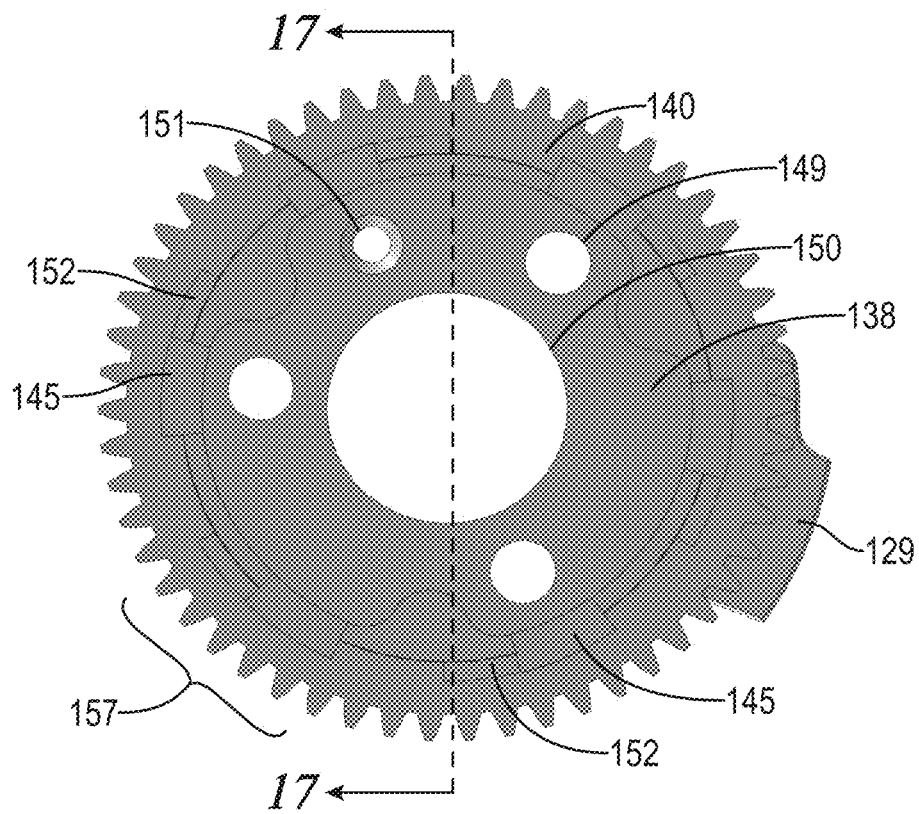
FIG. 16 is a front elevational view of the gear assembly of FIG. 14.

Referring now to FIGS. 13-15, the novel clutch assembly 116 disclosed herein also includes an improved shifter 129. The novel clutch assembly 116 eschews the camming-blade-driven clutch shift system of the conventional clutch 16 assembly and thus completely omits the conventional clutch shift 29 and circular rotating knife 41 with camming blade 72 and knives 61, respectively, and pivoting actuation arm 32 of the prior art. Instead, the novel clutch assembly 116 includes an improved shifter 129 configured to engage the circumferential rim 203 of the clutch gear 140 and push the clutch gear 140 forward F along the drive sleeve 138 toward the forward end 144 of the drive sleeve 138 when actuated by the solenoid assembly 136. Unlike the conventional clutch shift 29, the improved shifter 129 includes no pivots, blades, or other wearable parts or surfaces, which provides a shift system that is safer, crisper, and more reliable.

The improved shifter 129 includes a generally arcuate body 247 and a post 248. The arcuate body 247 defines a concave edge 249 sized and shaped to receive the rear circumferential rim 203 of the clutch gear 140 and permit the rim 203 to rotate through (i.e., against) the concave edge 249. In one embodiment, the concave edge 249 is a stepped edge 249. The post 248 extends from the arcuate body 247 in a direction opposite the concave edge 249. The post 248 defines a distal end 250 opposite the arcuate body 247. The distal end 250 of the post 248 defines a sloped surface 252. The arcuate body 247 and post 248 are received in the notch 228 and bore 229 in the sidewall 224 of the clutch housing 127, respectively. The post 248 rides in the bore 229. The arcuate body 247 is contoured to ride both in the notch 228 and partially inside the interior spaced 225 defined by the open front end 164 of the clutch housing 127. This arrangement restricts movement of the shifter 129 in the clutch housing 127 to longitudinal movement parallel to the central longitudinal axis 20. The sloped surface 252 of the distal end 250 of the post 248 faces the central longitudinal axis 20 when the shifter 129 is properly seated in the notch 228 and bore 229 of the sidewall 224. The sloped surface 252 of the post is a male camming surface 251. The male camming surface 251 is configured to interface with a portion of the solenoid assembly 136. As explained in more detail below, the improved shifter 129 and solenoid assembly 136 form an improved shift system that is more linear than the conventional shift system. This advantageously reduces the number of directions in which motion must be transferred during clutch actuation, which in turn requires less mechanical strength to actuate and reduces the possible points of wear and failure in the clutch assembly 116.

Solenoid Assembly

Referring now to FIG. 13, the novel clutch assembly 116 further includes an improved solenoid assembly 136 secured to the clutch housing 127. The solenoid assembly 136 is secured to the clutch housing 127 at a normal angle to the longitudinal axis 20. The solenoid assembly 136 is configured to cam the shifter 129 longitudinally forward F relative to the clutch housing 127 and parallel to the longitudinal axis 20 when the solenoid assembly 136 is actuated. The solenoid assembly 136 is electrically and manually actuatable. The improved solenoid assembly 136 includes a two-piece solenoid housing 254, a plunger 256, a compression spring 258, a plunger rod 260, and a shifter actuation lever 270. A cannon plug 262 on the solenoid housing 254 serves as a connection point for a cable from the GCU 18 to supply power to the solenoid assembly 136 from the external power source 19.

The solenoid housing 254 includes a pull-type solenoid body 255 and a solenoid adapter 257. The solenoid adapter 257 is secured to the clutch housing 127 by two fasteners 253. The solenoid body 255 is secured to the solenoid adapter by two additional fasteners 259. The solenoid body 255 and solenoid adapter 257 together define an internal space 261 of the solenoid housing 254 in which the plunger 256 is received. The plunger 256 includes a plunger head 262 and an elongated actuation arm 264 extending from the plunger head 262. The actuation arm 264 is integrally formed with the plunger head 262. However, in other embodiments, the actuation arm 264 can be separately formed and subsequently connected to the plunger head 262 to form plunger 256. The plunger head 262 is received in the portion of the internal space 261 defined by the solenoid body 255. The actuation arm 264 extends from the plunger head 262 through the portion of the internal space 261 defined by the solenoid adaptor 257 and into the non-circular aperture 230 in the sidewall 224 of the clutch housing 127. The actuation arm 264 extends into the clutch housing 127 normal to the longitudinal axis 20. The plunger 256, actuation arm 264, and plunger rod 260 extend linearly through the solenoid housing 254. The actuation arm 264 and plunger rod 260 extend out the solenoid housing 254.

The actuation arm 264 is designed to actuate the shifter 129 when the solenoid assembly 136 is actuated. As such, the actuation arm 264 includes a slot 265 having an angled distal wall 266. The angled distal wall 266 functions as a female camming surface 267. The portion of the actuation arm 264 in which the slot 265 is formed is received in the aperture 230 through the sidewall of the clutch housing 127. The distal end 250 of the shifter post 248 is received in the slot 265. The sloped surface 252 of the distal end 250 of the shifter post 248 is received against the angled distal wall 266 of the actuation arm slot 265. The sloped surface 252 of the post 248 substantially engages the angled distal wall 266 of the actuation arm 264. The sloped surface 252 of the distal end of the shifter post functions as a male camming surface 251 against the female camming surface 267. The actuation arm 264 and the aperture 230 in which it is received are non-cylindrical so as to prevent the actuation arm 264 from undesirably rotating within the sidewall 224 of the clutch housing 127 and disengaging the male 251 and female 267 camming surfaces from one another. Maintaining substantially constant engagement between the male and female camming surfaces 251, 267 ensures that the clutch assembly 116 is immediately responsive to actuation.

Electric actuation of the solenoid assembly 136 magnetically retracts the plunger head 262 into the solenoid housing 254, which in turns pulls the actuation arm 264 in a direction extending radially away from the longitudinal axis 20. Retraction of the plunger head 262 causes the portion of the actuation arm 264 received in the aperture 230 of the clutch housing sidewall 224 to pull against the distal end 250 of the shifter post 248 received in the bore 229 of the clutch housing sidewall 224 and move the shifter 129 longitudinally forward F within the sidewall 224. The shifter 129 in turn pushes the clutch gear 140 forwardly F along the drive sleeve 238 into the extended position. Put another way, the shifter 129 is configured to push the drive teeth 152 of the clutch gear 140 into engagement with the crowns 145 while the drive sleeve 138 is rotating with the rotor 12.

More specifically, retraction of the actuation arm 264 causes the angled distal wall 266 (i.e., female camming surface 267) of the actuation arm slot 265 to pull against the sloped surface 252 (i.e., male camming surface 251) on the distal end 250 of the shifter post 248. The angled distal wall 266 and sloped surface 252 cam against each other to translate the shifter post 248 along the angled distal wall 266 and thereby move the entire shifter 129 longitudinally forward F within the sidewall 224 of the clutch housing 127 parallel to the longitudinal axis 20. Forward longitudinal movement F of the shifter 129 coordinately moves the clutch gear 140 longitudinally forward F along the drive sleeve 138 because the circumferential rim 203 of the clutch gear 140 is received in the concave edge 249 of the shifter body 247.

Figure 11:
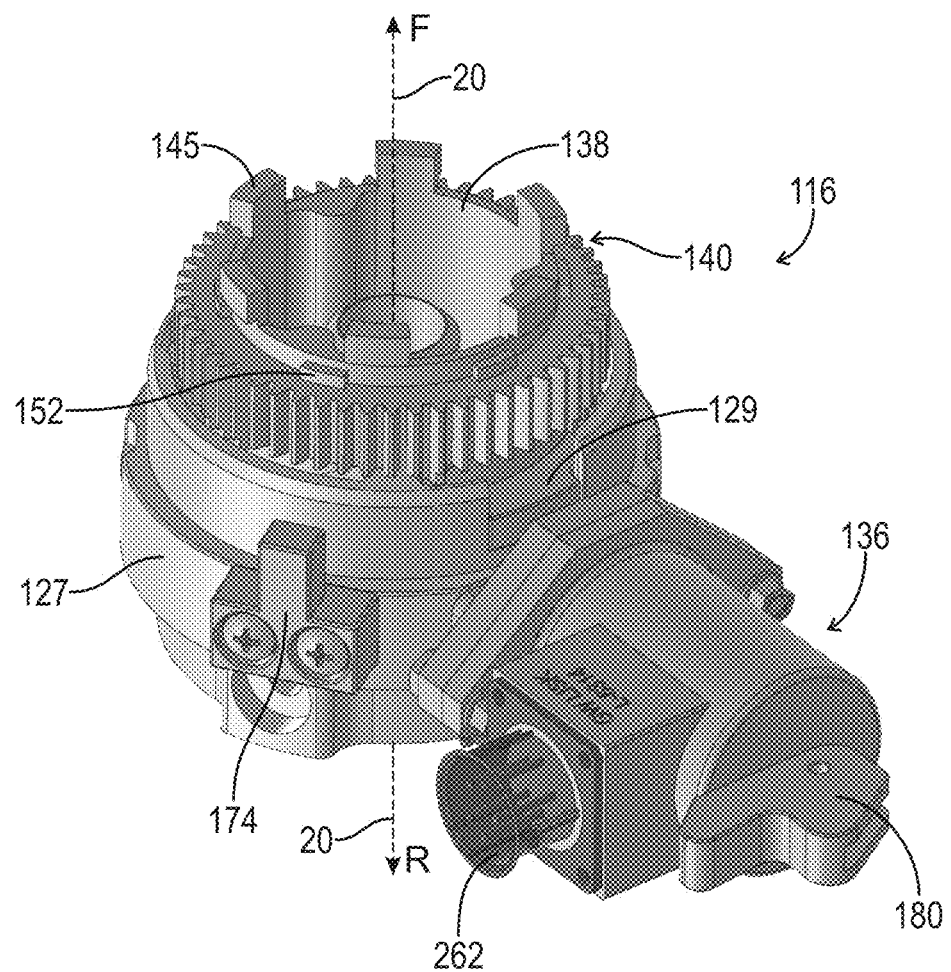
FIG. 11 is a perspective view of the novel clutch assembly of FIG. 10 showing the clutch gear in the retracted position.

The shifter 129 is automatically returned to a default at-rest position by the plurality of plunger assemblies 200 on the drive sleeve 138 when the supply of electrical power to the solenoid assembly 136 is ceased. The shifter 129 is in the at-rest position when the arcuate body 247 of the shifter is seated in the clutch housing notch 228, as best shown in FIGS. 11, 19C, and 19D. To explain, when power to the solenoid assembly 236 is cut off, the compression spring 258 in the solenoid assembly 136 pushes the plunger 256 back toward the clutch housing 127. This moves the actuation arm 264 toward the longitudinal axis 20 and positions the slot 265 in the which the shifter post 248 is received directly in line with the bore 229 in which the shifter post 248 rides. This allows the shifter post 248 to translate rearwardly back along the angled distal wall 266 into the trough 268 of the slot 265. The plunger assemblies 200 in the drive sleeve 138 provide the necessary force to push the shifter 129 rearwardly R back along the angled distal wall 266 into the slot trough 268 when the plunger assemblies 200 push the clutch gear 140 back into the retracted position. The rearward force applied by the plunger assemblies 200 to the clutch gear 140 is communicated through the clutch gear 140 to the shifter 129 by virtue of the contact between the clutch gear rim 203 and the concave edge 249 of the shifter body 247.

Shifter Actuation Lever

As noted above, the improved solenoid assembly 136 is both manually and electrically actuatable. Manual actuation is achieved via operation of the shifter actuation lever 270 and plunger rod 260. The shifter actuation lever 270 is pivotably connected to the plunger rod 260. In an embodiment, the shifter actuation lever 270 is connected to the plunger rod 260 by a pivot pin 271. The shifter actuation lever 270 is connected to an end 272 of the plunger rod 260 located outside the solenoid housing 254. The opposite end 273 of the plunger rod 260 is connected to the plunger head 262 by a pin 274. The plunger rod 260 extends from the plunger head 262 in a direction linearly opposite from the actuation arm 264. The plunger rod 260 extends through a portion of the internal space 261 defined by the solenoid body 255 and through a wall 275 of the solenoid housing 254. The plunger rod 260 extends from the plunger head 262 out of the solenoid housing 254 through the wall 275.

The compression spring 258 is disposed inside the internal space 261 defined by the solenoid body 255. The compression spring 258 is received on (i.e., around) the plunger rod 260 in the internal space 264 between the plunger head 262 and the wall 275 of the solenoid body 255. The compression spring 258 rides on the plunger rod 260. One end of the spring 258 is captured in a recess 277 defined in the plunger head 262. The recess 277 is concentric around the plunger rod 260. The other end of the spring is received against the wall 275 of the solenoid body 255. In this way, the compression spring 258 is arranged inside the solenoid housing 254 to urge the plunger 256 (and thus the plunger rod 260 and actuation arm 264) toward the clutch housing 127 and the longitudinal axis 20. The solenoid housing 254 and the sidewall 224 of the clutch housing 127 encapsulate the plunger head 262 and actuation arm 264. This advantageously protects the solenoid body 255, plunger 256, compression spring 258, and actuation arm 264 from damage and wear. The plunger 256, plunger rod 260, and actuation arm 264 are thus arranged for reciprocating linear movement within the solenoid housing 254.

As best shown in FIG. 19E, the shifter actuation lever 270 defines three surfaces: a rest surface 276, a working surface 278, and a neutral surface 280. The placement of each surface 276, 278, 280 relative to the solenoid housing wall 275 corresponds to a different functional position of the lever 270. Specifically, the shifter actuation lever 270 is in the resting position when the rest surface 276 is adjacent the solenoid housing wall 275 (see, e.g., FIGS. 11, 19A, 19E). The lever 270 is in the working position when the working surface 278 is adjacent the solenoid housing wall 275 (see, e.g., FIG. 20A). The lever 270 is in the neutral position when the neutral surface 280 is adjacent the solenoid housing wall 275 (see, e.g., FIG. 21A). The lever 270 is manually pivotable between these three functional positions.

Each lever position corresponds to a different functional state of the clutch assembly 116 because the point of connection with the plunger rod 260 about which the lever 270 is pivotable (e.g., the pivot pin 271) is spaced from each surface 276, 278, 280 so that a different length of the plunger rod is pulled out of the solenoid housing 254 for each functional position of the lever 270. Since the lever 270 is connected to the solenoid plunger 256 via the plunger rod 260, pulling different lengths of the plunger rod 260 out of the solenoid housing 254 retracts the plunger head 262 and actuation arm 264 into the solenoid housing 254 by different lengths, which in turn translates the shifter 129 and clutch gear 140 longitudinally forward F along the drive sleeve 138 by correspondingly different amounts.

Pivotal movement of the lever 270 between the different functional positions causes the solenoid assembly 136 to differently actuate the shifter 129 and, in turn, the clutch gear 140. So, when the lever 270 is in the resting position, the clutch gear 140 is in the retracted position (see, e.g., FIGS. 19A-19E). When the lever 170 is in the working position, the clutch gear 140 is in the extended position (see, e.g., FIGS. 20A-20D). When the lever 170 is in the neutral position, the clutch gear 140 is in the neutral position (see, e.g., FIGS. 21A-21D).

The lever 170 is pivotable between positions by pulling the lever 170 away from the solenoid housing wall 275 and pivoting the lever 270 about the pivot pin 271 to the desired position. Pulling the lever 270 away the from solenoid housing wall 275 compresses the spring 258 inside the solenoid housing 254 with the recess 277 of the plunger head 262. Once the lever 270 has been pivoted to the desired position, the lever is released. Upon release of the lever 270, the compression spring 258 biases the plunger head 262 back toward the longitudinal axis 20 and the at-rest position. The force applied to the plunger head 262 by the spring 258 is transmitted through the plunger rod 260 to the lever 270. This maintains the lever 270 in the selected working position by compressing the selected surface of the lever 270 against the opposing exterior surface of the solenoid housing wall 275. The compression spring 258 in the solenoid housing 254 exerts a pulling force on the lever 270 though the plunger rod 260 and thereby causes the surface of the lever 270 placed adjacent the solenoid housing wall 275 to engage and remain engaged with the exterior surface of the solenoid housing wall 275 until the lever 270 is manually pivoted to a different position or the solenoid assembly 136 is electrically actuated.

The manual functionalities of the improved solenoid assembly 136 enabled by the shifter actuation lever 270 and plunger rod 260 provide numerous benefits over conventional clutch assemblies. For example, the ability to manually place the shifter actuation lever 270 in the working position and thereby engage the clutch gear 140 with the drive sleeve 138 advantageously enables an operator to safely perform a "hand off check" by manually rotating the barrels 13 to push a single round of ammunition completely through the feeder delinker 15 (i.e., from insertion to ejection without firing the round) in order to verify that the machine gun 100 is feeding properly. This ability to manually engage the clutch gear 140 with the drive sleeve 138 also increases the operational capabilities of a machine gun equipped with a novel clutch assembly 116 disclosed herein by enabling a gun to remain functional even if the cabling providing power to the solenoid assembly 136 were to become damaged.

Additionally, the manual functionalities of the shifter actuation lever 270 and plunger rod 260 do not necessarily override the normal electrically actuated magnetic function of the solenoid assembly 136. For example, manually pivoting the shifter actuation lever 270 to the neutral position moves the clutch gear 140 to the neutral position. However, subsequent electrical actuation of the solenoid assembly 136 (e.g., by pulling the trigger 175 of the machine gun 100) initiates normal magnetic retraction of the plunger 256. This overrides the neutral position set by the shifter actuation lever 270 and causes the clutch gear 140 to move longitudinally forward F to the extended position as described above. It also moves the plunger rod 260 and lever 270 a small distance away from (i.e., further out of) the wall 275 of the solenoid housing 254.

In one embodiment, the lever 270 is configured such that the distance by which the lever 270 is moved from the solenoid housing wall 275 during electrical actuation of the solenoid assembly 136 is insufficient for the lever 270 to pivot to a different functional position. Ceasing electrical actuation of the solenoid assembly 136 allows the plunger assemblies 200 in the drive sleeve 138 to return the clutch gear 140 to the functional position set by the lever 270 (i.e., neutral). At the same time, the compression spring 258 inside the solenoid housing 254 likewise moves the solenoid plunger 256 and plunger rod 260 back toward the clutch housing 127, which reengages the lever 270 with the exterior surface of the solenoid housing wall 275 and maintains the lever 270 in the neutral position.

In another embodiment, a torsion spring (not shown) can be housed in the shifter actuation lever 270. The torsion spring can be a 270-degree torsion spring. The torsion spring can be configured to return the lever 270 to the resting position upon electrical actuation of the solenoid assembly 136. More specifically, the torsion spring can be configured to pivot the lever 270 from the neutral surface 280 to the rest surface 276 upon electrical actuation of the solenoid assembly 136 when magnetic retraction of the plunger into the solenoid housing 254 causes the plunger rod 260 to move a small distance further out of the solenoid housing 254 as noted above. Returning the shifter actuation lever 270 to the resting position upon electrical actuation of the solenoid assembly 136 ensures that the machine gun 100 returns to normal function state that is familiar to operators of currently available rotary machine guns. In this way, a torsion spring or similar biasing member used to reset the shifter actuation lever 270 can help avoid potential operator-induced malfunctions.

The neutral position is a completely unique functionality of novel clutch assemblies 116 disclosed herein that expands the operational capabilities of rotary machine guns 100 equipped with them into a wide range of new combat applications. For example, during firing, the clutch gear 140 spins in the counterclockwise Cc direction to drive the feeder delinker 15. As explained above, when the clutch gear 140 is in the neutral position, it can be freely rotated in either the clockwise Cw or counterclockwise Cc direction, despite being constantly meshed with the drive gear 59 of the feeder delinker 15. This means that a rotary machine gun 100 equipped with a novel clutch assembly 116 disclosed herein that has been manually placed in the neutral position via the shifter actuation lever 270 can rely entirely on a separately powered booster motor 24 (i.e., not connected to the GCU 18) to push ammunition from an ammunition canister 23 up through a feed chute 9 into the feeder delinker 15 without trigger initiation. The ensuing rotation of the feeder delinker 15 caused by the feed of ammunition from the booster motor 24 will simply cause the clutch gear 140 to rotate in the clockwise Cw direction without otherwise affecting or interfering with any other components or operations of the machine gun 100. This dramatically reduces the chance that a feed-related malfunction will occur by avoiding the traditional risk that a feeder delinker 15 initially driven by a conventional clutch assembly 16 and rotor 12 will stretch or otherwise wear out ammunition links as the feeder delinker 15 pulls in linked ammunition. Moreover, circumventing the traditional requirement to initially manually feed ammunition into the feeder delinker 15 enables continuous autonomous loading, operation (i.e., firing), and reloading of the rotary machine gun by remotely- or artificial intelligence-controlled robotic armatures and other systems.

Although embodiments of the present invention have been described in detail, it will be understood by those skilled in the art that various modifications can be made therein without departing from the spirit and scope of the invention as set forth in the appended claims. For example, although the exemplar embodiment of a clutch assembly 116 for a rotary machine gun 100 disclosed herein is depicted and described in the context of an M134 rotary machine gun, it is to be understood that novel clutch assemblies constructed in accordance with the present invention could in other embodiments be adapted to function with one or more different rotary machine guns. Furthermore, although the M134 rotary machine gun is typically chambered for 7.62× 51 mm NATO cartridges, it is to be understood that the novel clutch assemblies of the present invention are functional with rotary machine gun chambered in different calibers, including but not limited to 5.56×45 mm NATO and .338 Norma Magnum, among others.

All of the components and parts of the novel clutch assemblies disclosed herein can be manufactured from any suitably durable material(s) known in the art, including but not limited to, aluminum, steel, inconel, and the like.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific apparatus and methods described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A clutch assembly for a rotary machine gun, comprising:
   a drive sleeve configured to be mounted to a rotor of the rotary machine gun, the drive sleeve having a forward end and a plurality of crowns at the forward end;
   a clutch gear slidably mounted on the drive sleeve; and
   at least one plunger assembly on the drive sleeve configured to urge the clutch gear rearwardly along the drive sleeve away from the plurality of crowns.

2. The clutch assembly of claim 1, wherein:
   the clutch gear is configured to be rotationally engaged by the plurality of crowns; and the at least one plunger assembly is a plurality of spring-loaded plunger assemblies configured to urge the clutch gear out of rotational engagement with the plurality of crowns.

3. The clutch assembly of claim 1, wherein:
the at least one plunger assembly comprises a spring and a plunger head;
the drive sleeve houses the spring and plunger head; and
the plunger head interfaces with the clutch gear through the drive sleeve.

4. The clutch assembly of claim 1, wherein:
the at least one plunger assembly comprises a spring and a plunger head defining a protruding ledge;
the drive sleeve comprises an open-sided bore in which the spring and plunger head are received;
the clutch gear includes an inner circumferential surface in which is defined an annular groove; and
the ledge protrudes through the open side of the bore into the annular groove.

5. The clutch assembly of claim 1, further comprising a clutch housing including at least one gear stop thereon, wherein:
the clutch gear includes a plurality of forwardly extending drive teeth configured to engage the plurality of crowns, a plurality of rearwardly extending lugs configured to engage the at least one gear stop, and a gear width extending from a forward end of the drive teeth to a rear end of the lugs;
the drive sleeve defines a longitudinal axis; and
the plurality of crowns is spaced along the longitudinal axis from at least one gear stop by a distance greater than the gear width such that the clutch gear is rotatable on the drive sleeve in each of two opposing directions between the plurality of crowns and the at least one gear stop without engaging either the crowns or the at least one gear stop.

6. A rotary machine gun, comprising the clutch assembly of claim 1.

* * * * *